US011855835B2

(12) United States Patent
Chari et al.

(10) Patent No.: US 11,855,835 B2
(45) Date of Patent: Dec. 26, 2023

(54) AVAILABILITY AND REDUNDANCY FOR VCORES

(71) Applicant: ARRIS Enterprises LLC, Suwanee, GA (US)

(72) Inventors: Santhana Chari, Johns Creek, GA (US); Kyoo Lee, Andover, MA (US); David Grubb, Doylestown, PA (US); David E. Virag, Johns Creek, GA (US); Thomas J. Cloonan, Lisle, IL (US); Mircea Orban, Toronto (CA); Michael J. Emmendorfer, Chesterfield, MO (US); Shawn Warner, Pepperell, MA (US)

(73) Assignee: ARRIS Enterprises LLC, Suwanee, GA (US)

( * ) Notice: Subject to any disclaimer, the term of this patent is extended or adjusted under 35 U.S.C. 154(b) by 147 days.

(21) Appl. No.: 17/225,853

(22) Filed: Apr. 8, 2021

(65) Prior Publication Data

US 2022/0070052 A1    Mar. 3, 2022

Related U.S. Application Data

(60) Provisional application No. 63/071,961, filed on Aug. 28, 2020, provisional application No. 63/071,940, filed on Aug. 28, 2020, provisional application No. 63/071,935, filed on Aug. 28, 2020, provisional application No. 63/071,922, filed on Aug. 28, 2020, provisional application No. 63/071,915, filed on Aug. 28, 2020, provisional application No. 63/071,930, filed on Aug. 28, 2020.

(51) Int. Cl.
*H04L 41/0668* (2022.01)
*H04N 21/61* (2011.01)
*H04L 67/568* (2022.01)

(52) U.S. Cl.
CPC ........ *H04L 41/0668* (2013.01); *H04L 67/568* (2022.05); *H04N 21/6118* (2013.01); *H04N 21/6125* (2013.01)

(58) Field of Classification Search
CPC ............ H04N 21/6118; H04N 21/6125; H04L 67/568; H04L 41/0668
USPC ...................................................... 725/143
See application file for complete search history.

(56) References Cited

U.S. PATENT DOCUMENTS

| 2004/0034871 A1 | 2/2004 | Lu et al. |
| 2015/0092531 A1 | 4/2015 | Bernstein et al. |
| 2015/0270988 A1* | 9/2015 | Finkelstein ......... H04L 41/0806 370/401 |

(Continued)

OTHER PUBLICATIONS

DVB Organization: "CM-SP-R-PHY-I10-180509.pdf", DVB, Digital Video Broadcasting, Sep. 12, 2019 (Sep. 12, 2019), p. 1-445. (Year: 2019).*

(Continued)

*Primary Examiner* — Alfonso Castro
(74) *Attorney, Agent, or Firm* — Chernoff, Vilhauer, McClung & Stenzel, LLP

(57) ABSTRACT

A cable distribution system includes a head end connected to a plurality of customer devices through a transmission network that includes a remote fiber node that converts digital data to analog data suitable for the plurality of customer devices, where the head end includes at least one server each of which includes a respective processor.

17 Claims, 25 Drawing Sheets

(56) References Cited

U.S. PATENT DOCUMENTS

2017/0244577 A1\* 8/2017 Patrick ............... H04L 12/4633
2018/0192327 A1   7/2018 Gaydos et al.
2019/0124407 A1   4/2019 Shen et al.

OTHER PUBLICATIONS

DVB Organization: "CM-SP-R-PHY-110-180509.pdf", DVB, Digital Video Broadcasting, C/O EBU-17A Ancienne Route—CH-1218 Grand Saconnex, Geneva—Switzerland, May 13, 2018 (May 13, 2018).
DVB Organization: "SCTE ARRIS Virtualized CCAP.pdf" DVB, Digital Video Broadcasting, C/O EBU-17A Ancienne Route—CH-1218 Grand Saconnex, Geneva—Switzerland. Oct. 26, 2017 (Oct. 26, 2017).
Emmendorfer Michael J: "WB1.2—Cable Operator's Access Architecture from Aggregation to Disaggregation and Distributed (Plenary)", 2019 IEEE Photonics Society Summer Topical Meeting Series (Sum), IEEE, Jul. 8, 2019 (Jul. 8, 2019).
Invitation to Pay Additional Fees Re: Application No. PCT/US2021/026461 (dated Jul. 14, 2021).
International Search Report and Written Opinion Re: Application No. PCT/US2021/026461 (dated Sep. 7, 2021).

\* cited by examiner

AVAILABILITY AND REDUNDANCY FOR VCORES

CROSS REFERENCE TO RELATED APPLICATIONS

This application claims the benefit of U.S. Provisional Patent Application No. 63/071,915 filed Aug. 28, 2020; claims the benefit of U.S. Provisional Patent Application No. 63/071,922 filed Aug. 28, 2020; claims the benefit of U.S. Provisional Patent Application No. 63/071,930 filed Aug. 28, 2020; claims the benefit of U.S. Provisional Patent Application No. 63/071,935 filed Aug. 28, 2020; claims the benefit of U.S. Provisional Patent Application No. 63/071,940 filed Aug. 28, 2020; claims the benefit of U.S. Provisional Patent Application No. 63/071,961 filed Aug. 28, 2020.

BACKGROUND

The subject matter of this application relates to vCores.

Cable Television (CATV) services provide content to large groups of customers (e.g., subscribers) from a central delivery unit, generally referred to as a "head end," which distributes channels of content to its customers from this central delivery unit through an access network comprising a hybrid fiber coax (HFC) cable plant, including associated components (nodes, amplifiers and taps). Modern Cable Television (CATV) service networks, however, not only provide media content such as television channels and music channels to a customer, but also provide a host of digital communication services such as Internet Service, Video-on-Demand, telephone service such as VoIP, home automation/security, and so forth. These digital communication services, in turn, require not only communication in a downstream direction from the head end, through the HFC, typically forming a branch network and to a customer, but also require communication in an upstream direction from a customer to the head end typically through the HFC network.

To this end, CATV head ends have historically included a separate Cable Modem Termination System (CMTS), used to provide high speed data services, such as cable Internet, Voice over Internet Protocol, etc. to cable customers and a video headend system, used to provide video services, such as broadcast video and video on demand (VOD). Typically, a CMTS will include both Ethernet interfaces (or other more traditional high-speed data interfaces) as well as radio frequency (RF) interfaces so that traffic coming from the Internet can be routed (or bridged) through the Ethernet interface, through the CMTS, and then onto the RF interfaces that are connected to the cable company's hybrid fiber coax (HFC) system. Downstream traffic is delivered from the CMTS to a cable modem and/or set top box in a customer's home, while upstream traffic is delivered from a cable modem and/or set top box in a customer's home to the CMTS. The Video Headend System similarly provides video to either a set-top, TV with a video decryption card, or other device capable of demodulating and decrypting the incoming encrypted video services. Many modern CATV systems have combined the functionality of the CMTS with the video delivery system (e.g., EdgeQAM—quadrature amplitude modulation) in a single platform generally referred to an Integrated CMTS (e.g., Integrated Converged Cable Access Platform (CCAP))—video services are prepared and provided to the I-CCAP which then QAM modulates the video onto the appropriate frequencies. Still other modern CATV systems generally referred to as distributed CMTS (e.g., distributed Converged Cable Access Platform) may include a Remote PHY (or R-PHY) which relocates the physical layer (PHY) of a traditional Integrated CCAP by pushing it to the network's fiber nodes (R-MAC PHY relocates both the MAC and the PHY to the network's nodes). Thus, while the core in the CCAP performs the higher layer processing, the R-PHY device in the remote node converts the downstream data sent from the core from digital-to-analog to be transmitted on radio frequency to the cable modems and/or set top boxes, and converts the upstream radio frequency data sent from the cable modems and/or set top boxes from analog-to-digital format to be transmitted optically to the core.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
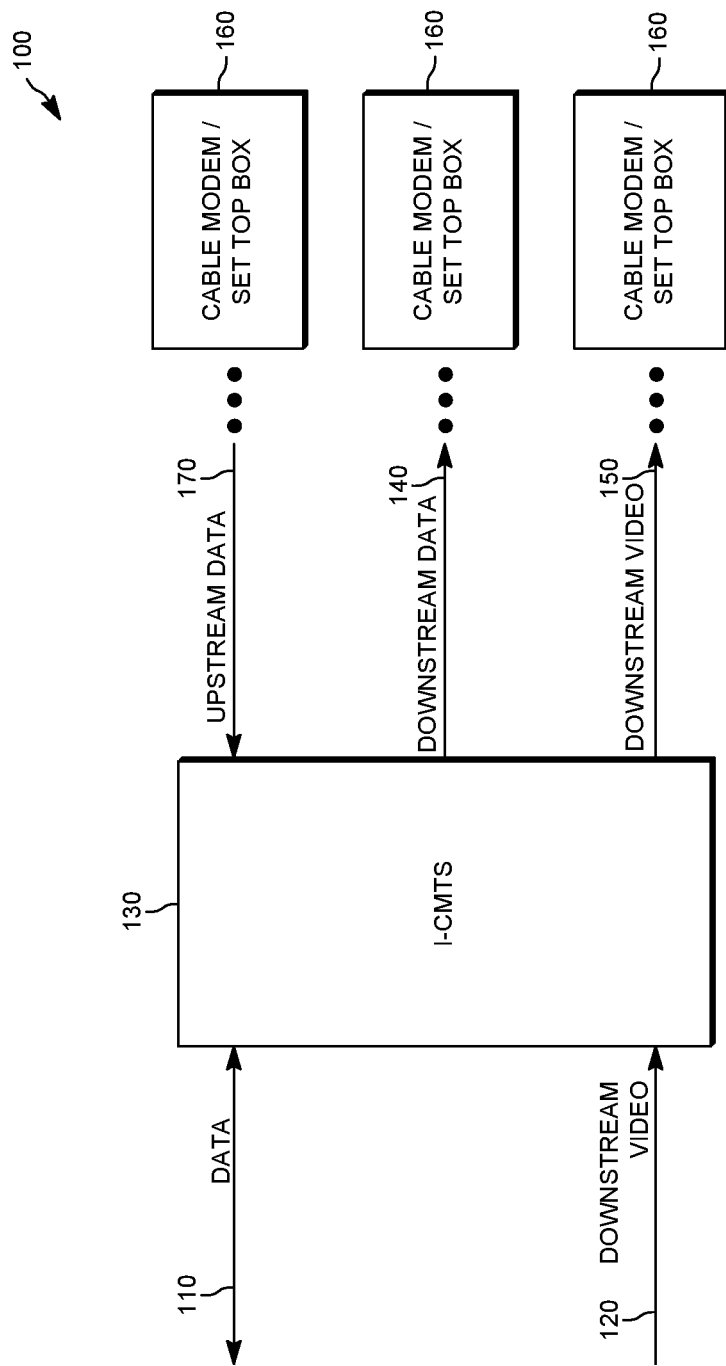
FIG. 1 illustrates an integrated Cable Modem Termination System.

Referring to FIG. 1, an integrated CMTS (e.g., Integrated Converged Cable Access Platform (CCAP)) 100 may include data 110 that is sent and received over the Internet (or other network) typically in the form of packetized data. The integrated CMTS 100 may also receive downstream video 120, typically in the form of packetized data from an operator video aggregation system. By way of example, broadcast video is typically obtained from a satellite delivery system and pre-processed for delivery to the subscriber though the CCAP or video headend system. The integrated CMTS 100 receives and processes the received data 110 and downstream video 120. The CMTS 130 may transmit downstream data 140 and downstream video 150 to a customer's cable modem and/or set top box 160 through a RF distribution network, which may include other devices, such as amplifiers and splitters. The CMTS 130 may receive upstream data 170 from a customer's cable modem and/or set top box 160 through a network, which may include other devices, such as amplifiers and splitters. The CMTS 130 may include multiple devices to achieve its desired capabilities.

Figure 2:
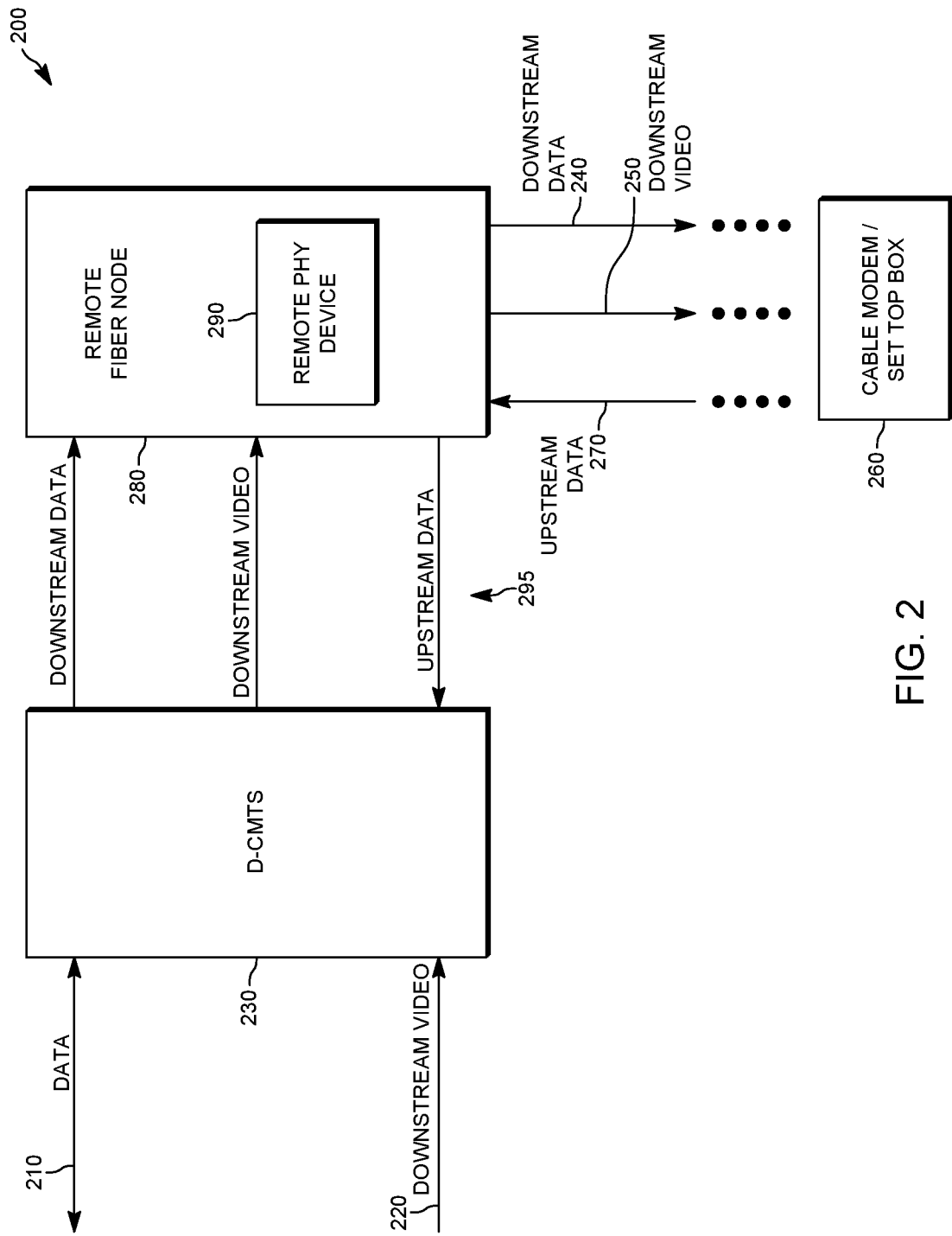
FIG. 2 illustrates a distributed Cable Modem Termination System.

Referring to FIG. 2, as a result of increasing bandwidth demands, limited facility space for integrated CMTSs, and power consumption considerations, it is desirable to include a Distributed Cable Modem Termination System (D-CMTS) 200 (e.g., Distributed Converged Cable Access Platform (CCAP)). In general, the CMTS is focused on data services while the CCAP further includes broadcast video services. The D-CMTS 200 distributes a portion of the functionality of the I-CMTS 100 downstream to a remote location, such as a fiber node, using network packetized data. An exemplary D-CMTS 200 may include a remote PHY architecture, where a remote PHY (R-PHY) is preferably an optical node device that is located at the junction of the fiber and the coaxial. In general, the R-PHY often includes the PHY layers of a portion of the system. The D-CMTS 200 may include a D-CMTS 230 (e.g., core) that includes data 210 that is sent and received over the Internet (or other network) typically in the form of packetized data. The D-CMTS 200 may also receive downstream video 220, typically in the form of packetized data from an operator video aggregation system. The D-CMTS 230 receives and processes the received data 210 and downstream video 220. A remote Fiber node 280 preferably include a remote PHY device 290. The remote PHY device 290 may transmit downstream data 240 and downstream video 250 to a customer's cable modem and/or set top box 260 through a network, which may include other devices, such as amplifier and splitters. The remote PHY device 290 may receive upstream data 270 from a customer's cable modem and/or set top box 260 through a network, which may include other devices, such as amplifiers and splitters. The remote PHY device 290 may include multiple devices to achieve its desired capabilities. The remote PHY device 290 primarily includes PHY related circuitry, such as downstream QAM modulators, upstream QAM demodulators, together with psuedowire logic to connect to the D-CMTS 230 using network packetized data. The remote PHY device 290 and the D-CMTS 230 may include data and/or video interconnections, such as downstream data, downstream video, and upstream data 295. It is noted that, in some embodiments, video traffic may go directly to the remote physical device thereby bypassing the D-CMTS 230. In some cases, the remote PHY and/or remote MAC PHY functionality may be provided at the head end.

By way of example, the remote PHY device 290 may covert downstream DOCSIS (i.e., Data Over Cable Service Interface Specification) data (e.g., DOCSIS 1.0; 1.1; 2.0; 3.0; 3.1; and 4.0 each of which are incorporated herein by reference in their entirety), video data, out of band signals received from the D-CMTS 230 to analog for transmission over RF or analog optics. By way of example, the remote PHY device 290 may convert upstream DOCSIS, and out of band signals received from an analog medium, such as RF or linear optics, to digital for transmission to the D-CMTS 230. As it may be observed, depending on the particular configuration, the R-PHY may move all or a portion of the DOCSIS MAC and/or PHY layers down to the fiber node.

I-CMTS devices are typically custom built hardware devices that consist of a single chassis that include a series of slots, each of which receives a respective line card with a processor, memory, and other computing and networking functions supported thereon. Each of the line cards include the same hardware configuration, processing capabilities, and software. Each of the line cards performs the functions of the I-CMTS device, including the MAC and PHY functionality. As the system increasingly scales to support additional customers, additional line cards are included with the system to expand the processing capability of the system. Unfortunately, it is problematic to dynamically scale the number of line cards in a real-time manner to meet the demands of a particular network.

The computational power of microprocessor based commercial off the shelf (COTS) server platforms are increasing while the expense of such systems is decreasing over time. With such systems, a computing system may be, if desired, virtualized and operated using one or more COTS server, generally referred to herein as a virtual machine. Using container technologies running on the COTS server and/or virtual machine, the COTS server may operate with only a single operating system. Each of the virtualized applications may then be isolated using software containers, such that the virtualized application may not see and are not aware of other virtualized applications operating on the same machine. Typically, each COTS server includes one or more Intel/AMD processors (or other processing devices) with associated memory and networking capabilities running an operating system software. Typically, the COTS servers include a framework and an operating system where user applications are run on such framework and the operating system is abstracted away from the actual operating system. Each virtual machine may be instantiated and operated as one or more software applications running on a COTS server. A plurality of software containers may be instantiated and operated on the same COTS server and/or the same virtual machine. A plurality of COTS servers is typically included in one or more data centers, each of which are in communication with one another. A plurality of COTS server may be located in different geographic areas to provide geo-redundancy. In some embodiments, the container may include the same functionality as a virtual machine, or vice versa. In some embodiments, a grouping of containerized components, generally referred to as a pod, may be in the form of a virtual machine.

In some embodiments, the COTS servers may be "bare metal" servers that typically include an operating system thereon together with drivers and a portion of a container orchestration system. One or more containers are then added to the "bare metal" server while being managed by the container orchestration system. The container orchestration system described herein may likewise perform as, and be referred to as, a virtual machine orchestration system, as desired. In some embodiments, "bare metal" servers may be used with pods running on the operating system thereon together with drivers and a container orchestration system. In some embodiments, virtual machines may be omitted from the COTS servers.

Selected software processes that are included on a line card and/or a remote PHY device may be run on a "bare metal" server and/or virtual machine, including software containers, running on a COTS server, including both "active" and "back-up" software processes. The functionality provided by such a "bare metal" server and/or virtual machine may include higher level functions such as for example, packet processing that includes routing Internet packet provisioning, layer 2 virtual private networking which operates over pseudowires, and multiprotocol label switching routing. The functionality provided by such a "bare metal" server and/or virtual machine may include DOCSIS functions such as for example, DOCSIS MAC and encapsulation, channel provisioning, service flow management, quality of service and rate limiting, scheduling, and encryption. The functionality provided by such a "bare metal" server and/or virtual machine may include video processing such as for example, EQAM and MPEG processing.

Each of the COTS servers and/or the virtual machines and/or software containers may contain different hardware profiles and/or frameworks. For example, each of the COTS servers and/or "bare metal" servers and/or virtual machines and/or software containers may execute on different processor types, different number of processing cores per processor, different amounts of memory for each processor type, different amounts of memory per processing core, different cryptographic capabilities, different amounts of available off-processor memory, different memory bandwidth (DDR) speeds, and varying types and capabilities of network interfaces, such as Ethernet cards. In this manner, different COTS servers and/or "bare metal" servers and/or virtual machines and/or software containers may have different processing capabilities that vary depending on the particular hardware. Each of the COTS servers and/or "bare metal" servers and/or the virtual machine and/or software containers may contain different software profiles. For example, each of the COTS servers and/or "bare metal" servers and/or virtual machines and/or software containers may include different software operating systems and/or other services running thereon, generally referred to herein as frameworks. In this manner, different COTS servers and/or "bare metal" servers and/or virtual machines and/or software containers may have different software processing capabilities that vary depending on the particular software profile.

Figure 3:
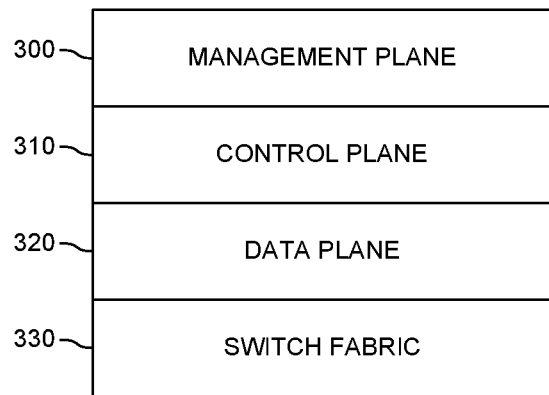
FIG. 3 illustrates a layered network processing stack.

Referring to FIG. 3, for data processing and for transferring data across a network, the architecture of the hardware and/or software may be configured in the form of a plurality of different planes, each of which performing a different set of functionality. In relevant part the layered architecture may include different planes such as a management plane 300, a control plane 310, a data plane 320, and switch fabric 330 to effectuate sending and receiving packets of data.

For example, the management plane 300 may be generally considered as the user interaction or otherwise the general software application being run. The management plane typically configures, monitors, and provides management, and configuration served to all layers of the network stack and other portions of the system.

For example, the control plane 310 is a component to a switching function that often includes system configuration, management, and exchange of routing table information and forwarding information. Typically, the exchange of routing table information is performed relatively infrequently. A route controller of the control plane 310 exchanges topology information with other switches and constructs a routing table based upon a routing protocol. The control plane may also create a forwarding table for a forwarding engine, generally referred to as elements. In general, the control plane may be thought of as the layer that makes decisions about where traffic is sent. Since the control functions are not performed on each arriving individual packet, they tend not to have a strict speed constraint.

For example, the data plane 320 parses packet headers for switching, manages quality of service, filtering, medium access control, encapsulations, and/or queuing. As a general matter, the data plane carriers the data traffic, which may be substantial in the case of cable distribution networks. In general, the data plane may be thought of as the layer that primarily forwards traffic to the next hop along the path to the selected destination according to the control plane logic through the switch fabric. The data plane tends to have strict speed constraints since it is performing functions on each arriving individual packet.

For example, the switch fabric 330 provides a network topology to interconnect network nodes via one or more network switches.

As the system increasingly scales to support additional customers, additional COTS servers and/or "bare metal" servers and/or virtual machines and/or software containers are included with the system to expand the processing capability of the overall system. To provide processing redundancy, one or more additional COTS servers and/or "bare metal" servers and/or virtual machines and/or software containers may be included that are assigned as "back-up" which are exchanged for an "active" process upon detection of a failure event. The scaling of the data plane 320 on COTS servers and/or "bare metal" servers and/or virtual machines and/or software containers to service dynamically variable processing requirements should be performed in such a manner that ensures sufficiently fast processing of data packets and sufficient bandwidth for the transmission of the data packets to ensure they are not otherwise lost.

It is desirable to virtualize the data plane, and in particular a portion of the Remote PHY functionality on a COTS server and/or "bare metal" servers. In this manner, the MAC cores for the cable distribution system may run on COTS servers and/or "bare metal" servers. By way of reference herein, a virtualized Remote PHY MAC Core may be referred to herein as a vCore instance.

Figure 4:
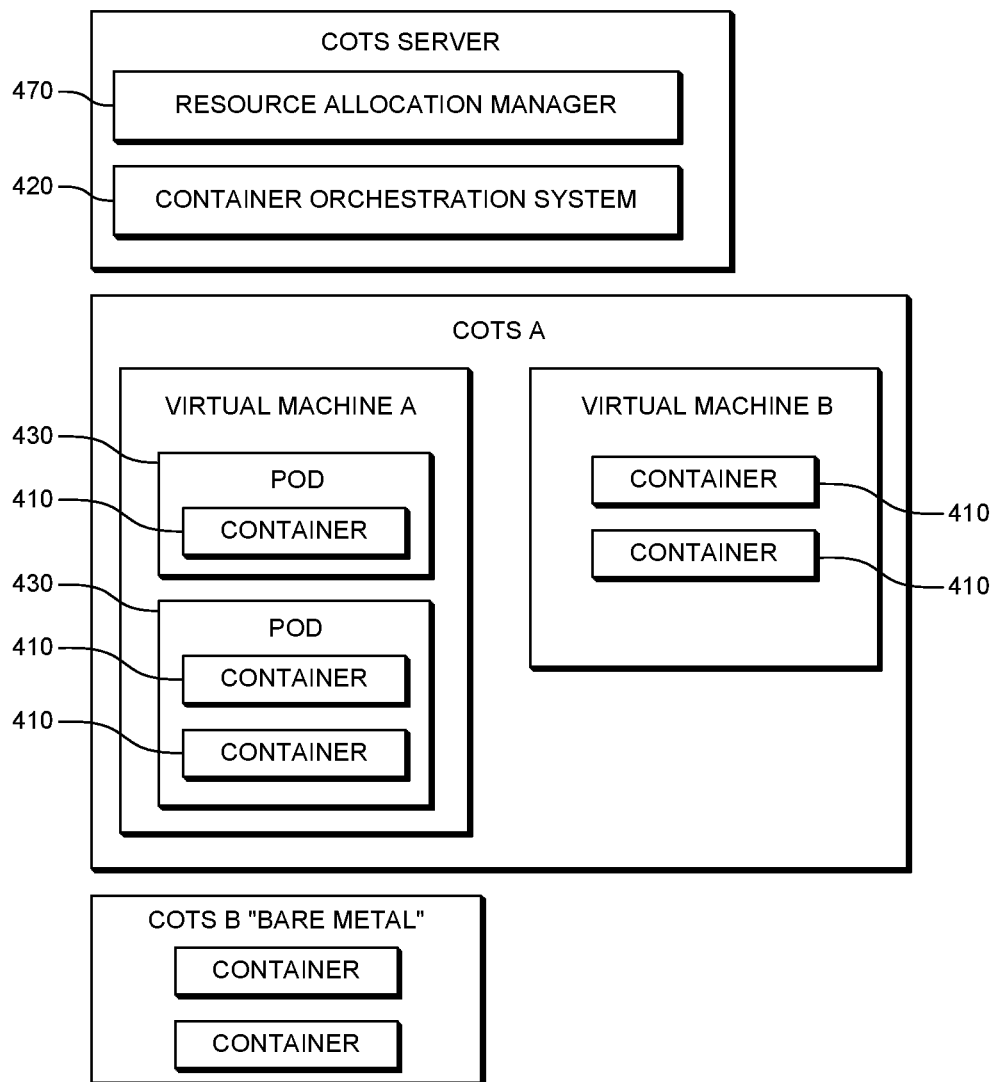
FIG. 4 illustrates a server system with a resource allocation manager and a container orchestration system.

Referring to FIG. 4, it is desirable to incorporate platform as a service that uses operating system level virtualization to deliver software in packages, generally referred to as containers 410. Each of the containers are isolated from one another and bundle their own software, libraries, and configuration files. The containers may communicate with one another using defined channels. As a general matter, one or more applications and its dependencies may be packed in a virtual container that can run on a COTS server and/or "bare metal" server and/or a virtual machine. This containerization increases the flexibility and portability on where the application may run, such as an on-premises COTS server, a "bare metal" server, a public cloud COTS server, a private cloud COTS server, or otherwise. With each container being relatively lightweight, a single COTS server and/or "bare metal" server and/or a virtual machine operating on a COTS server and/or "bare metal" server may run several containers simultaneously. In addition, the COTS server and/or "bare metal" server and/or the virtual machine and/or the containers may be distributed within the cable distribution system.

A COTS server and/or "bare metal" server and/or a virtual machine may include a container orchestration system 420 for automating the application deployment, scaling, and management of the containers 410 across one or more COTS servers and/or "bare metal" servers and/or virtual machines. Preferably the computing device running the container orchestration system 420 is separate from the computing device providing the containers for the dataplane applications. It is to be understood that the virtual machine illustrated in FIG. 4 may be omitted, such as the COTS B. The application deployment, scaling, and management of the containers may include clusters across multiple hosts, such as multiple COTS servers. The deployment, maintaining, and scaling, of the containers may be based upon characteristics of the underlying system capabilities, such as different processor types, different number of processing cores per processor, different amounts of memory for each processor type, different amounts of memory per processing core, different amounts of available off-processor memory, different memory bandwidth (DDR) speeds, different frameworks, and/or varying types and capabilities of network interfaces, such as Ethernet cards. Moreover, the container orchestration system 420 may allocate different amounts of the underlying system capabilities, such as particular processor types, a selected number of processors (e.g., 1 or more), a particular number of processing cores per selected processor, a selected amount of memory for each processor type, a selected amount of memory per processing core, a selected amount of available off-processor memory, a selected framework, and/or a selected amount and/or type of network interface(s), such as Ethernet cards. A corresponding agent for the container orchestration system 420 may be included on each COTS server (e.g., COTS A and/or COTS B).

The container orchestration system 420 may include a grouping of containerized components, generally referred to as a pod 430. A pod consists of one or more containers that are co-located on the same COTS server and/or "bare metal" server and/or the same virtual machine, which can share resources of the same COTS server and/or "bare metal" server and/or same virtual machine. Each pod 430 is preferably assigned a unique pod IP address within a cluster, which allows applications to use ports without the risk of conflicts. Within the pod 430, each of the containers may reference each other based upon a localhost or other addressing service, but a container within one pod preferably has no way of directly addressing another container within another pod, for that, it preferably uses the pod IP address or otherwise an addressing service.

A traditional D-CMTS RPHY Core may be implemented as a specialty built appliance including both software and hardware to achieve desired performance characteristics, such as ensuring the timing of the transfer of data packets. The specially built appliance is not amenable to automatic deployment nor automatic scaling due to the fixed nature of its characteristics. In contrast to a specially built appliance, the vCore instance is preferably implemented in software operating on a COTS server and/or "bare metal" server on top of an operating system, such as Linux. The vCore instance is preferably implemented in a manner that readily facilitates automation techniques such as lifecycle management, flexible scaling, health monitoring, telemetry, etc. Unfortunately, running a vCore instance on a COTS server and/or "bare metal" server tends to result in several challenges, mostly related to the data plane components. One of the principal challenges involves ensuring that data is provided to the network in a timely and effective manner to achieve the real time characteristics of a cable data distribution environment. The cable data distribution environment includes real time constraints on the timing of data packet delivery, which is not present in typical web-based environments or database environments.

Each vCore instance is preferably implemented within a container, where the size (e.g., scale, memory, CPU, allocation, etc.) of each container translates into the amount of server hardware and software resources assigned to the particular vCore instance. The amount of server hardware and software resources assigned to each particular vCore instance is preferably a function of the number of groups of customers (e.g., service groups) and/or number of customers that the vCore instance can readily provide RPHY MAC Core services to. For example, a limited amount of server hardware and software resources may be assigned to a particular vCore instance that has a limited number of groups of customers and/or customers. For example, a substantial amount of server hardware and software resources may be assigned to a particular vCore instance that has a substantial number of groups of customers and/or customers. For example, selected server hardware resources are preferably allocated among the different vCore instances in a non-overlapping manner so that each vCore instance has a dedicated and predictable amount of server hardware resources. For example, selected software resources are preferably allocated among the different vCore instances in a non-overlapping manner so that each vCore instance has a dedicated and predictable amount of software resources.

For example, the number of CPU cores preferably assigned to each vCore instance (Cc) may be a function of the total USSG (upstream service groups—groups of customer modems and/or set top boxes) (USsg) and the total DSSG (downstream service groups—groups of customer modems and/or set top boxes) (DSsg) connected through that vCore instance. This may be represented as vCore: $Cc=f_1$ (USsg, DSsg). Other hardware and/or software characteristics may likewise be assigned, as desired.

For example, the network capacity assigned to each vCore instance (Cbw) may be a function of the of the total USSG (upstream service groups—groups of customer modems and/or set top boxes) (USsg) and the total DSSG (downstream service groups—groups of customer modems and/or set top boxes) (DSsg) connected to that vCore instance. This may be represented as $Cbw=f_2$ (USsg, DSsg). Other hardware and/or software characteristics may likewise be assigned, as desired.

The scaling of the vCore instance may refer to the capability to automatically create and deploy a vCore instance within a container on a COTS server and/or "bare metal" server and/or virtual machine that is appropriately sized to serve a particular set of remote physical devices and/or service groups (e.g., sets of cable customers) and/or cable customers. The scaling of the vCore instance may also include, in some cases, the capability to automatically modify the hardware and/or software characteristics of an existing vCore instance within a container on a COTS server and/or "bare metal" server and/or virtual machine to be appropriately sized to serve a modified particular set of remote physical devices and/or service groups (e.g., sets of cable customers) and/or cable customers.

A resource allocation manager 470 may assign or reallocate a suitable amount of hardware and software of the COTS server and/or "bare metal" server resources to each particular vCore instance (e.g., CPU cores, and/or memory, and/or network capacity). The amount of such COTS server and/or "bare metal" server hardware and software resources assigned to or reallocate to each vCore instance may be a function of its scale and also other features, such as various other resource allocations. A corresponding agent for the resource allocation manager 470 may be included on each COTS server (e.g., COTS A, COTS B).

The vCore instance includes data plane software for the transfer of data packets and other functions of the data plane. The data plane software may include a set of data plane libraries and network interface controller (NIC) drivers that are used to manage the data packets for the data plane. Preferably, the data plane software operates in user space, as opposed to Kernel space like typical network processing software, thus it does not make use of the operating system kernel and container management network drivers and plugins. For example, the data plane software may include a queue manager, a buffer manager, a memory manager, and/or a packet framework for packet processing. The data plane software may use CPU cores that are isolated from the Kernel, meaning that the operating system scheduled processes are not running on these isolated CPU cores. The separation of the CPU cores between the data plane software and the operating system software ensures that tasks performed by the operating system software does not interfere with the data plane software processing the data packets in a timely manner. In addition, the separation of the CPU cores between the data plane software and the operating system software enables both to use the same physical central processing unit, albeit different cores, of the same physical central processing unit. In addition, other hardware and/or software capabilities may likewise be separated, such as for example, selected processors (e.g., 1 or more), particular number of processing cores per selected processor, selected amount of memory for each processor type, selected amount of memory per processing core, selected amount of available off-processor memory, selected framework, and/or selected amount and/or type of network interface(s).

It is also desirable for each vCore instance to have dedicated network bandwidth capability apart from other vCore instances and the operating system software. To provide dedicated network bandwidth for a vCore instance, the physical network interface cards may be virtualized so that a plurality of different software applications can make use of the same network interface card, each with a guaranteed amount of bandwidth available. The network interface cards are preferably virtualized using a single root input/output virtualization technique (SR-IOV). The SR-IOV partitions the NIC physical functions (e.g., PFs) into one or more virtual functions (VFs). The capabilities of the PFs and VFs are generally different. In general, the PF supports queues, descriptions, offloads, hardware lock, hardware link control, etc. In general, the VF supports networking features based upon queues and descriptors.

The automated creation, deployment, and removal of vCore instances may be performed by the container orchestration system 420.

Figure 5:
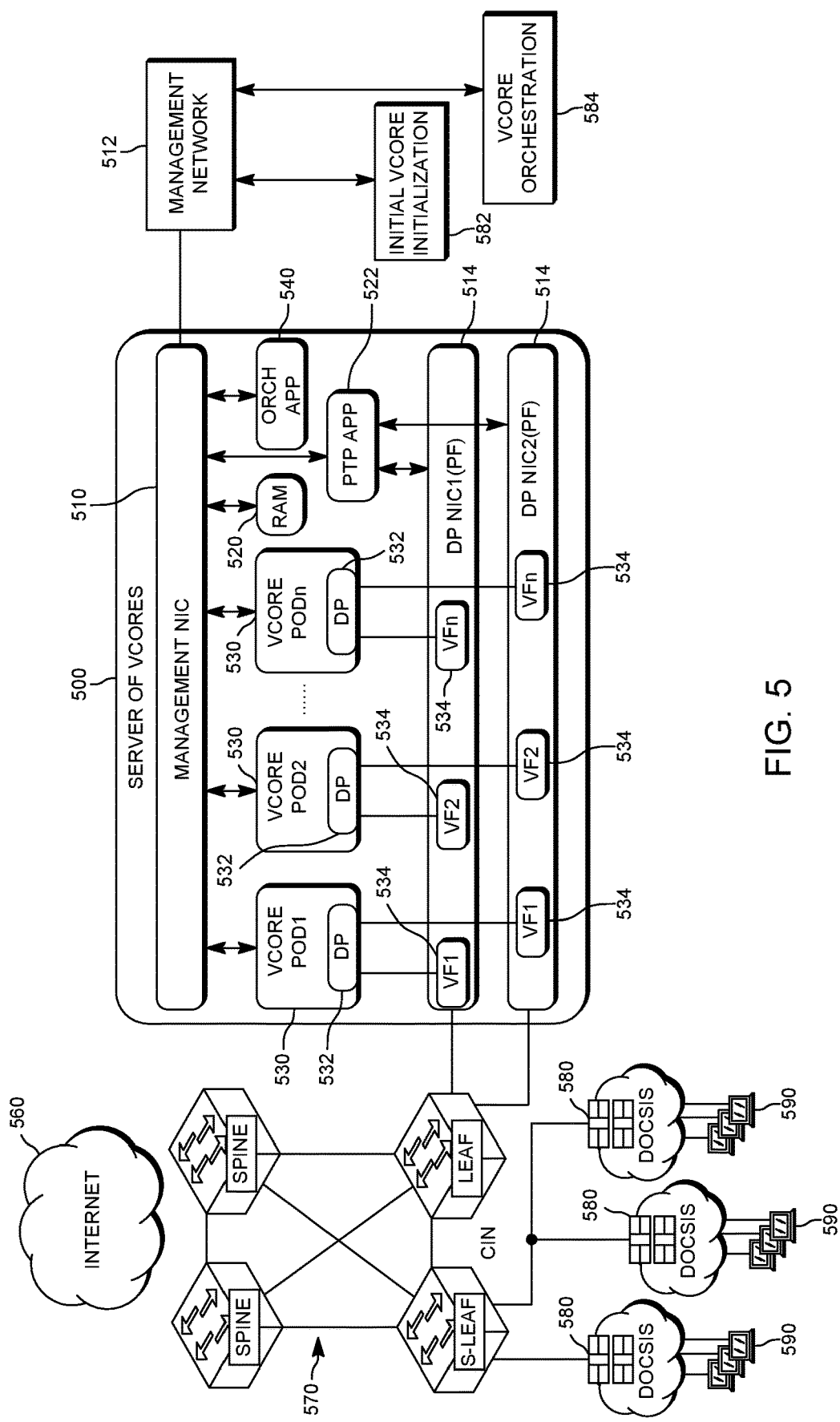
FIG. 5 illustrates a server system with containers and a container orchestration system.

Referring to FIG. 5, the vCore instances 530 may operate on a COTS server and/or "bare metal" server 500 acting as a remote PHY MAC core for one or more remote physical devices connected over a converged interconnect network, normally located in the same hub. The vCore instances 530 may include data plane software 532. Each of the vCore instances 530 as generally referred to as a POD. In some cases, multiple vCores may be included in a POD. The COTS server 500 may communicate with the Internet 560, a set of networking switches 570, to remote physical devices 580, and the customers 590. The COTS server and/or "bare metal" server including the vCore instances operating thereon is typically a relatively high performance server that has one or more of the following characteristics:

Hardware:

At least one management NIC 510 is connected to, usually, a separate management network 512 or otherwise a virtual network overlay. The management NIC 510 is primarily used for orchestration and management of the server application, which may also manage the data traffic.

Preferably at least two (for redundancy) data plane NICs 514 (i.e., data plane physical network interfaces) together with SR-IOV and PTP (IEEE 1588) 522 are included for hardware timestamping capabilities of the data packets. The data plane NICs 514 are used to provide connectivity to the remote physical devices and the customer modems and/or set top boxes/consumer premises equipment behind such remote physical devices. The vCore instances 530 may each include a virtual function 534 network interface to each of the data plane NICs 514.

In addition, the hardware may include dedicated devices for DES encryption.

Software:

Preferably the operating system on the COTS server and/or "bare metal" server is a LINUX OS such as Ubuntu, Redhat, etc.

The COTS Server and/or "bare metal" server and/or virtual machine includes container software.

The COTS Server and/or "bare metal" server and/or virtual machine and/or other server includes at least a part of a container orchestration system.

The COTS Server and/or "bare metal" server and/or virtual machine and/or other server includes a resource allocation manager (RAM) 520 that manages, at least in part, the server allocation of software and/or hardware resources for vCore instances, including for example: CPU Cores, memory, VFs, MAC addresses, etc. The RAM 520 may also provide server configuration, including OS configuration, driver support, etc., diagnostics and health monitoring. The COTS Server and/or "bare metal" server and/or virtual machine and/or other server may include an orchestration app 540 that manages, at least in part, the management of the vCores (e.g., containers and/or pods).

The COTS Server and/or "bare metal" server and/or virtual machine and/or other server may run the PTP application 522 that synchronizes the system clock of the COTS Server and/or "bare metal" server and/or virtual machine and/or vCore instances 520 based upon a grand master clock for the system as a whole. For increased accuracy, the PTP application 522 is preferably based upon hardware time stamping and a Precise Hardware Clock that is present on the NICs 514.

The container initialization and resource allocation for the containers may be performed in a distributed fashion. An initial vCore initialization 582 may be used to perform, or otherwise cause to be performed, a default configuration of an instantiated vCore. A vCore orchestration 584 may be used to perform, or otherwise cause to be performed, a management of the instantiated vCores together with allocation of resources for particular vCores. In this manner, the initial vCore initialization 582 and the vCore orchestration 584 work together to instantiate vCores, allocate resources to vCores, and manage the resourced instantiated vCores. The initial vCore initialization 582 preferably operates in conjunction with the orchestration app 540 on the server to instantiate the default vCores. The vCore orchestration 584 preferably operates in conjunction with the orchestration app 540 on the server to perform the orchestration of the vCores. The vCore orchestration 584 preferably operates in conjunction with the RAM 520 to allocate recourses for the vCores.

As noted previously, the COTS server that includes vCore instances has allocation of resources that are managed, at least in part, by the RAM 520. During the COTS server startup phase the RAM may create multiple resource pools (CPU Cores, data plane network VFs, encryption VFs, etc.), after which the RAM may assign or lease resources from each pool to vCore PODs upon deployment as requested by the container orchestration system 540. In addition, the RAM 520 may manage data encryption and decryption that may be selectively off loaded to dedicated hardware, as desired.

The RAM 520 may include a REST API that may be used to assign and free up resources, and which may also be used to determine resource availability and allocation status. The RAM 520 may also checkpoint periodically the resource pools status to an in-memory key-value database cache with durability and use that cached data in the event of a COTS server crash. The in-memory key-value database cache is preferably unsuitable for readily random access and is more suitable for reconstruction of the data back into memory in the event that the COTS server crashes.

A vCore instance configuration is typically composed of at least two parts. The first part may be the RPHY Mac Core configuration. The RPHY Mac Core configuration includes, for example, the DOCSIS, RF, RPD, cable-mac, IP addressing, routing, etc. The second part may be the data plane configuration 532. The data plane configuration 532 and in particular a virtualized data plane for RPHY MAC Core devices configuration includes, for example, CPU Core Ids that are used by the data plane 532, data plane network VF addresses that are used by the data plane 432, MAC addresses for the interfaces, encryption VFs addresses that are used for encryption offload, memory allocation, etc. In many embodiments, the RPHY Mac Core configuration is provided by the multiple system operators prior to actual configuration. The vCore instance of the data plane 532 may be determined based upon the resource information received from the RAM 520 by the vCore instance itself during the initialization phase. As a general matter, the vCore preferably performs the MAC layer functionality.

As previously described, a vCore is, in general, a software implementation of a CMTS core which includes data plane functionality that routes data packets between the public Internet and consumer premises equipment. The ability of a vCore to provide CMTS services is a function of the capabilities of the underlying hardware, which is typically a COTS server. Such COTS servers maintained within a data center typically include one or more processors, each of which normally includes an integrated plurality of cores (e.g., 4, 8, 16, 20, or more). In general, each core of each processor may be considered as its own computing system in that it has its own instruction pipeline, decoder, stack, and available memory. A software program that is decomposable into smaller parallel processing chunks may be substantially accelerated by scheduling the independent processing chunks to different cores of a multi-core processor and executing the independent processing chunks in at least a partial parallel manner. For example, a set of 10 independent functions can be split onto 10 cores and, if each function takes the equivalent time to complete, will execute generally 10 times faster than running all the 10 independent functions on a single core of a single core processor or on a single core of a multi-core processor. Accordingly, decomposing a software program into sub-programs and scheduling the sub-programs to be executed simultaneously on multiple cores of a processor provides acceleration of the processing and increases the efficiency of the hardware in terms of running more instructions per second when considering all the cores within the processor.

For a vCore, it is often desirable to reserve at least one of the cores for selective compute intensive operations, such as real-time data plane packet processing to maximize the performance throughput of the data packets.

Depending on the computing resources likely necessary for a set of one or more service groups, it is desirable to provide a vCore with sufficient computing resources to provide effective and timely processing. By way of example, allocating too few cores and/or vNIC bandwidth to a vCore will starve the service of resources, resulting in a reduced quality of service to customers. Also, depending on the computing resources likely necessary for a set of one or more service groups, it is desirable to provide a vCore without excessive computing resources to provide effective and timely processing. By way of example, allocating too many cores and/or reserving too much vNIC bandwidth to a vCore will not utilize the overall COTS server hardware efficiently leaving unused capabilities on the COTS server. Appropriate selection of one or more cores and/or vNIC bandwidth for a vCore is desirable. Further, it is desirable to efficiently install and configure vCores to allocate appropriate resources.

Figure 6:
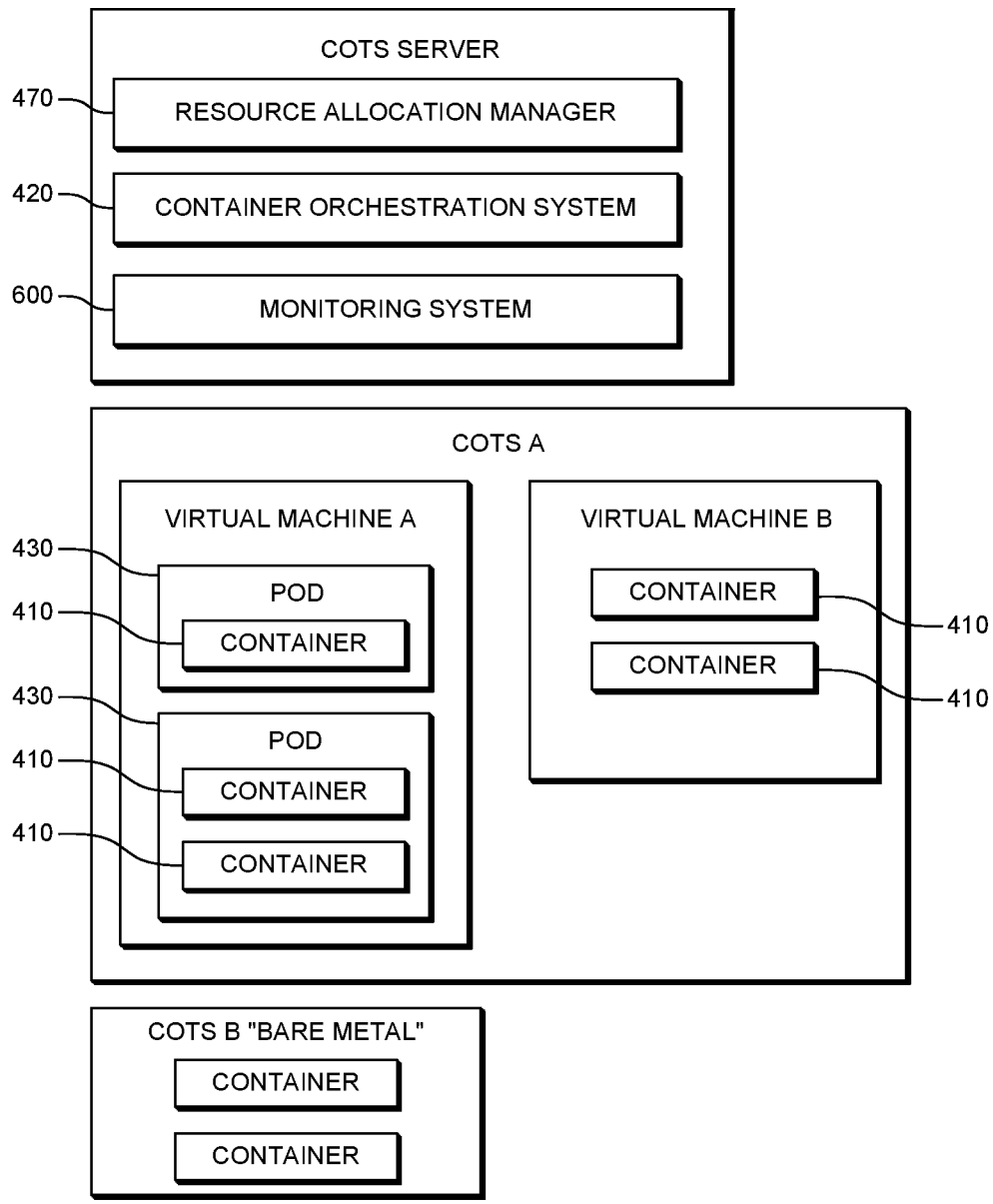
FIG. 6 illustrates a server system with a resource allocation manager, a container orchestration system, and a monitoring system.

Referring to FIG. 6, in some implementations to provide known processing capabilities each of the vCores is instantiated to include the same processing capabilities. Alternatively, different vCores may have different processing capabilities. A monitoring system 600 may monitor the activities of each of the vCores that are operating on one or more COTS servers and/or "bare metal" servers and/or virtual machines and/or software containers. The monitoring system 600 may detect when one or more of the vCores has a failure event. Upon detection of the failure event of one or more of the vCores, such as the failure of the software contained therein, by the monitoring system 600 a new vCore may be deployed to replace the failed vCore. The new vCore may be deployed on the same host as the failed vCore or may be deployed on a different host than the failed vCore. The new vCore is instantiated as a new software application which is booted and loaded with a configuration file describing the environment, such as for example, the RPHY Mac Core configuration and the data plane configuration. The vCore then reconnects with the other aspects of the system and thereafter operates in the same manner as the failed vCore. This process of instantiating, configuring, and reconnecting a new vCore requires several minutes, which is a substantial time for a service impact to the customers.

The monitoring system 600 may also monitor the activities of one or more COTS servers and/or "bare metal" servers and/or virtual machines. The monitoring system 600 may detect when one or more of the COTS servers and/or "bare metal" servers and/or virtual machines has a failure event. Upon detection of the failure event of one or more of the COTS servers and/or "bare metal" servers and/or virtual machines, such as the failure of the hardware (including network interface), by the monitoring system 600, one or more new COTS servers and/or "bare metal" servers and/or virtual machines may be deployed, or otherwise powered up, to replace the failed one or more COTS servers and/or "bare metal" servers and/or virtual machines. After starting a replacement failed one or more COTS servers and/or "bare metal" servers and/or virtual machines each of the vCores previously supported thereon is instantiated to boot the software and loaded with a respective configuration file describing the environment, such as for example, the RPHY Mac Core configuration and the data plane configuration. Each of the vCores will have a different configuration file. Each of the vCores are then reconnected with the other aspects of the system and thereafter operates in the same manner as the "failed" vCores and failed COTS servers and/or "bare metal" servers and/or virtual machines. This process of instantiating, configuring, and reconnecting the COTS servers and/or "bare metal" servers and/or virtual machines and associated vCores requires a substantially longer time than an isolated vCore failure, which is a substantial time for a service impact to the customers.

Figure 7:
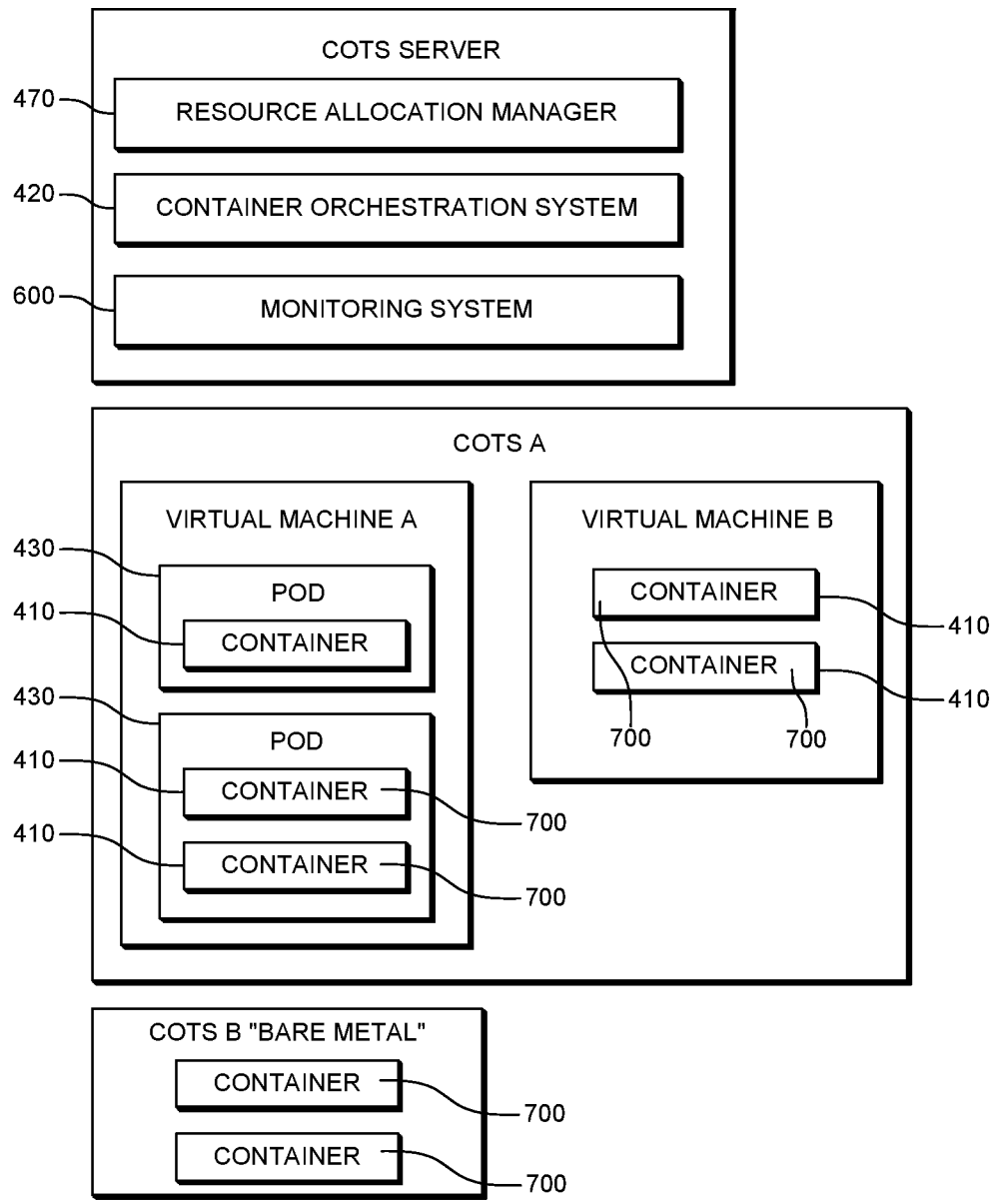
FIG. 7 illustrates a server system with a resource allocation manager, a container orchestration system, and a monitoring system with "back-up" vCores.

Referring to FIG. 7, to decrease the service impact to customers, a modified system should include one or more vCores 700 that are designed as "back-up" vCores 700. The "back-up" vCores are preferably instantiated with the appropriate software "running" (or otherwise in a suspended mode). In this manner, the "back-up" vCores are instantiated with operational software so that the time otherwise required to instantiate such a vCore in the event that the monitoring system 600 detects a failure of an "active" vCore is substantially reduced. Depending on the particular environment, a portion of the configuration describing the environment may be loaded onto the "back-up" vCore, such as for example, a portion of the RPHY Mac Core configuration (e.g., the DOCSIS, RF, RPD, cable-mac, IP addressing, routing, etc.) and a portion of the data plane configuration (e.g., the CPU Core Ids that are used by the data plane, data plane network VF addresses that are used by the data plane, MAC addresses for the interfaces, encryption VFs addresses that are used for encryption offload, memory allocation, etc.). As a result of the monitoring system 600 detecting the failure of a vCore, the "back-up" vCore is changed to an "active" vCore to replace the failed vCore. The configuration describing the environment is loaded onto the "active" vCore, or the portion of the configuration that was not already loaded onto the "back-up" vCore, such as for example, the RPHY Mac Core configuration (e.g., the DOCSIS, RF, RPD, cable-mac, IP addressing, routing, etc.) and the data plane configuration (e.g., the CPU Core Ids that are used by the data plane, data plane network VF addresses that are used by the data plane, MAC addresses for the interfaces, encryption VFs addresses that are used for encryption offload, memory allocation, etc.). The connections between the newly "active" vCore and the CPEs and/or RPDs (if any), are connected.

A memory structure may also checkpoint periodically the state of each vCore to an in-memory key-value database cache with durability and use that cached data in the event of a COTS server crash or otherwise the failure of a vCore. The in-memory key-value database cache is suitable for reconstruction of the data back into memory in the event that the COTS server crashes or otherwise the failure of a vCore. Also, the data may be stored in a database on a storage device, such as a hard drive. Preferably, the database is maintained on a COTS server (e.g., computing device), that is different than the computing devices maintaining the vCores. In this manner, if the computing devices supporting the vCores fail, the database will still be available. A key may be used to access the in-memory key-value database cache, which is provided to the "backup" vCore and/or computing device (e.g., server or otherwise) so that it may access the data in the cache.

Another type of data that should be periodically checkpointed is sequence numbers being used by each of the vCores. The reliable delivery of data (messages) is a purpose of a L2TP control channel. The L2TP includes sequence numbers that specify a message. The L2TP may include a packet structure that includes (1) flags and version, (2) length (optional), (3) Session ID, (4) Ns (optional), (5) Nr (optional), (6) offset size (optional), (7) offset pad (optional), (8) and payload data. In particular, Ns is a sequence number for a data or control message, beginning at zero and incrementing by one (modulo $2^{16}$) for each message sent, and is present only when sequence flag set. In particular, Nr is a sequence number for expected message to be received, where Nr is set to the Ns of the last in-order message received plus one (modulo $2^{16}$). Without the sequence number(s) being available, the newly "active" vCore would need to reconfigure the channel, which is a substantial time for a service impact to the customers. Accordingly, the checkpointing should include the sequence number(s) of the L2TP (layer 2 tunneling protocol). L2TP is described in IETF (1999), RFC 2661, Layer Two Tunneling Protocol "L2TP", incorporated by reference herein in its entirety. Other portions of the packet structure may likewise be included, as desired.

The checkpointing should also include the state for all of the components on the network, such as for example, remote physical devices, cable modems, consumer premise equipment, DHCP, routing/address resolution protocol data, etc. By way of example, the state may include, off-line, on-line, DHCP address, RF status, booting, cable source verify (verifies 1 mac address is tied to a single IP address), etc.

When the monitoring system 600 detects that one or more of the COTS servers and/or "bare metal" servers and/or virtual machines has a failure event, the destination address for the replacement COTS servers and/or "bare metal" servers and/or virtual machines is preferably selected to be within the same broadcast domain. The broadcast domain is a network address at which all devices connected to a multiple-access communications network are enabled to receive datagrams, which for example, may include UDP and TCP/IP packets for IPv4 networks. In other words, the broadcast domain is a logical division of a computer network in which all nodes can reach each other by broadcast at the data link layer. The broadcast domain may be within the same LAN segment or it can be bridged to other LAN segments. A message sent to the broadcast address maybe received by all networked attached hosts. If the switch associated with the replacement COTS server and/or "bare metal" server and/or virtual machine is not within the same broadcast domain then the corresponding switch should be automatically reprogrammed by the monitoring system 600, in an appropriate manner, to facilitate communication within the broadcast domain of the failed COTS server and/or "bare metal" server and/or virtual machine. In addition, the switch should facilitate communication with any remote physical devices using the same IP address as the failed vCore.

Figure 8:
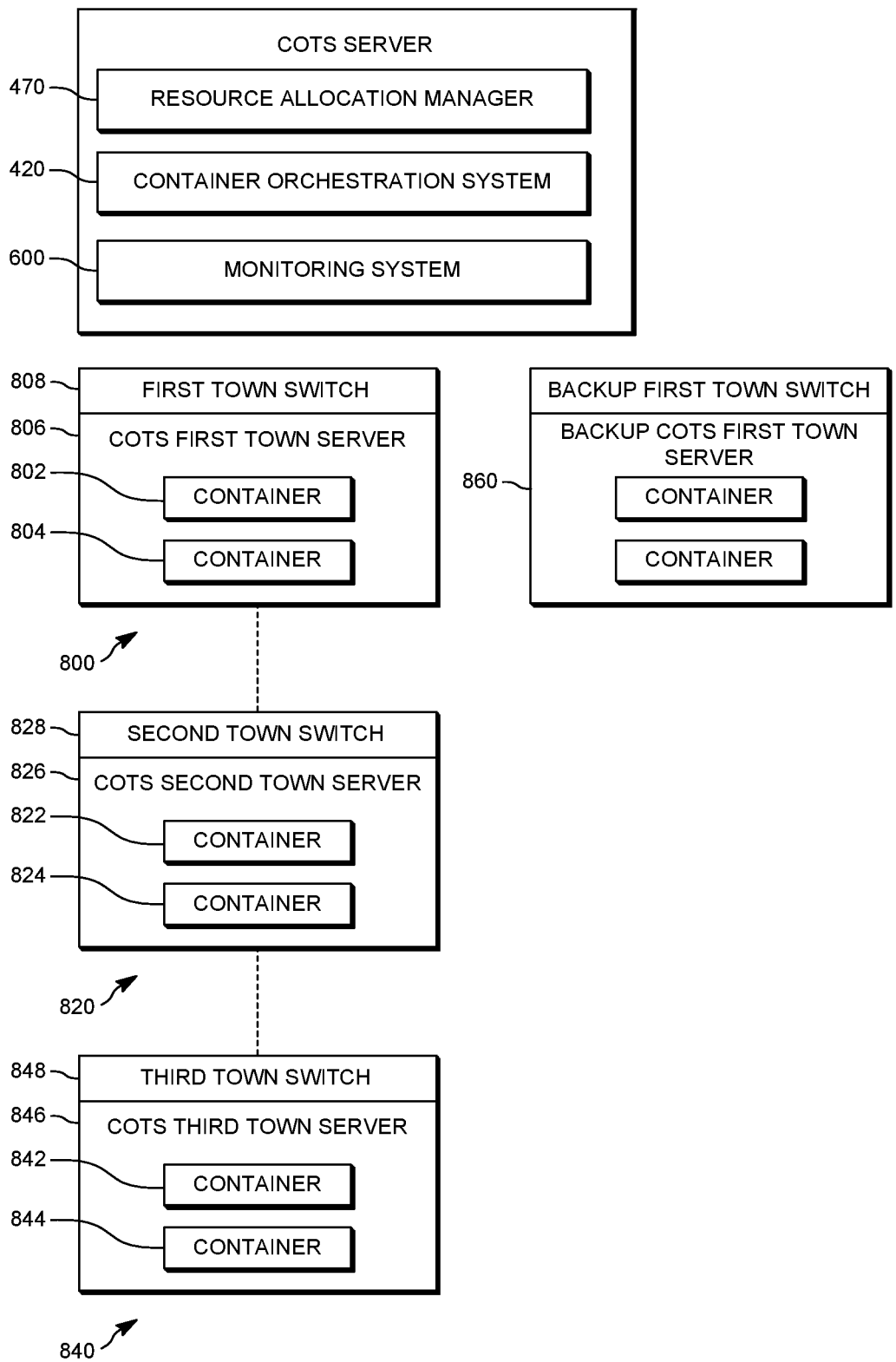
FIG. 8 illustrates multiple towns with a shared back-up COTS server and back-up vCores.

Referring to FIG. 8, an exemplary distributed networking system is illustrated. A first town 800 may include a relatively small population of customers (e.g., 5,000-10,000) which is serviced by two vCores 802, 804 operating on a single computing device 806 and one switch 808 for the broadcast domain of the first town 800. Multiple remote physical devices may be included, if desired for the first town. A second town 820 may also include a relatively small population of customers (e.g., 5,000-10,000) which is serviced by two vCores 822, 824 operating on a single computing device 826 and one switch 828 for the broadcast domain of the second town 820. Multiple remote physical devices may be included, if desired for the second town. A third town 840 may also include a relatively small population of customers (e.g., 5,000-10,000) which is serviced by two vCores 842, 844 operating on a single computing device 846 and one switch 848 for the broadcast domain of the third town 840. Multiple remote physical devices may be included for the third town, if desired. The broadcast domain for the first town, the second town, and the third town, may be different from one another. It may be computationally inefficient to include a spare computing device (e.g., server) at each of the first town 800, the second town 820, and the third town 840 in the event of the failure of the computing device. To increase the computational efficiency, it is desirable to include a spare "back-up" computing device 860 in less than all, such as only one, of the towns 800, 820, 840. In the event that one of the computing devices fail, or otherwise one of the vCores fails, then the failed computing device and/or failed vCore may be instantiated on the "back-up" computing device and configured accordingly.

If the "back-up" computing device 860 is in the first town 800 and the computing device 806 fails, then the associated switch (the first town switch and/or the back-up town switch) is likely to be already programmed to accommodate the broadcast domain of the first town for using the "back-up" computing device. If the "back-up" computing device is in the first town 800 and the computing device 826 fails, then the associated switch (the first town switch, the second town switch, and/or the back-up town switch) should be automatically re-programmed to accommodate the broadcast domain of the first town for using the "back-up" computing device. If the "back-up" computing device is in the first town 800 and the computing device 846 fails, then the associated switch (the first town switch, the third town switch, and/or the back-up town switch) should be automatically re-programmed to accommodate the broadcast domain of the first town for using the "back-up" computing device. In addition, a failed vCore on one computing device may be replaced by a new vCore on one of the other computing devices in one of the different towns, with appropriate programming of the respective switches.

Figure 9:
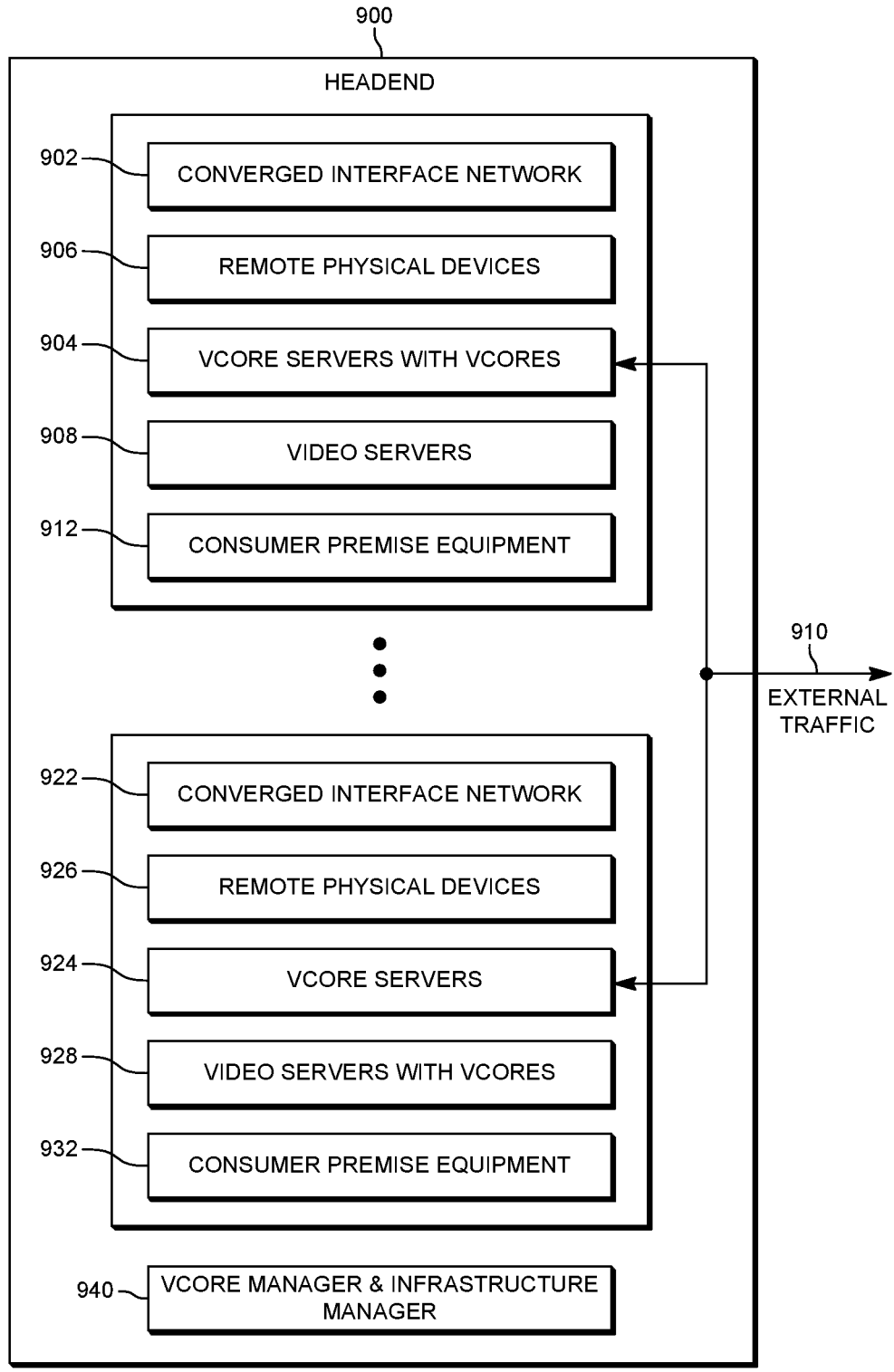
FIG. 9 illustrates a headend with multiple converged interface networks.

Referring to FIG. 9, in some cases for large deployments it is desirable to cluster together multiple network devices. A headend 900 may include a first converged interface network (CIN) 902, which includes a network of leaf switches and spine switches. The CIN 902 is interconnected to a set of vCores (e.g., 9-12) 904 running on one or more COTS servers and/or "bare metal" servers and/or virtual machines and/or software containers. The vCores 904 are interconnected to a set of remote physical devices 906, if desired. A set of one or more video servers 908 may be included, if desired. The vCores 904 and/or the RPDs 906 may be interconnected to the consumer premise equipment 912, such as a customer's gateway. The CIN 902 may be interconnected to a public network 910, such as the Internet. The first converged interface network 902 may be suitable for supporting 200,000 subscribers.

The headend 900 may include a second converged interface network (CIN) 922, which includes a network of leaf switches and spine switches. The CIN 922 is interconnected to a set of vCores (e.g., 9-12) 924 running on one or more COTS servers and/or "bare metal" servers and/or virtual machines and/or software containers. The vCores 924 are interconnected to a set of remote physical devices 926, if desired. A set of one or more video servers 928 may be included, if desired. The vCores 924 and/or the RPDs 926 may be interconnected to the consumer premise equipment 932, such as a customer's gateway. The CIN 922 may be interconnected to the public network 910, such as the Internet. The second converged interface network 922 may be suitable for supporting 200,000 subscribers.

The headend 900 may include additional such converged interface networks and associated devices therewith to support the customers. The headend 900 may also include a vCore manager 940 to manage the vCores, the CINs, the video servers, the RPDs, and the other infrastructure of the headend 900. The capacity of the headend 900 is somewhat limited because of the capacity to carry data to and from the external network 910.

Figure 10:
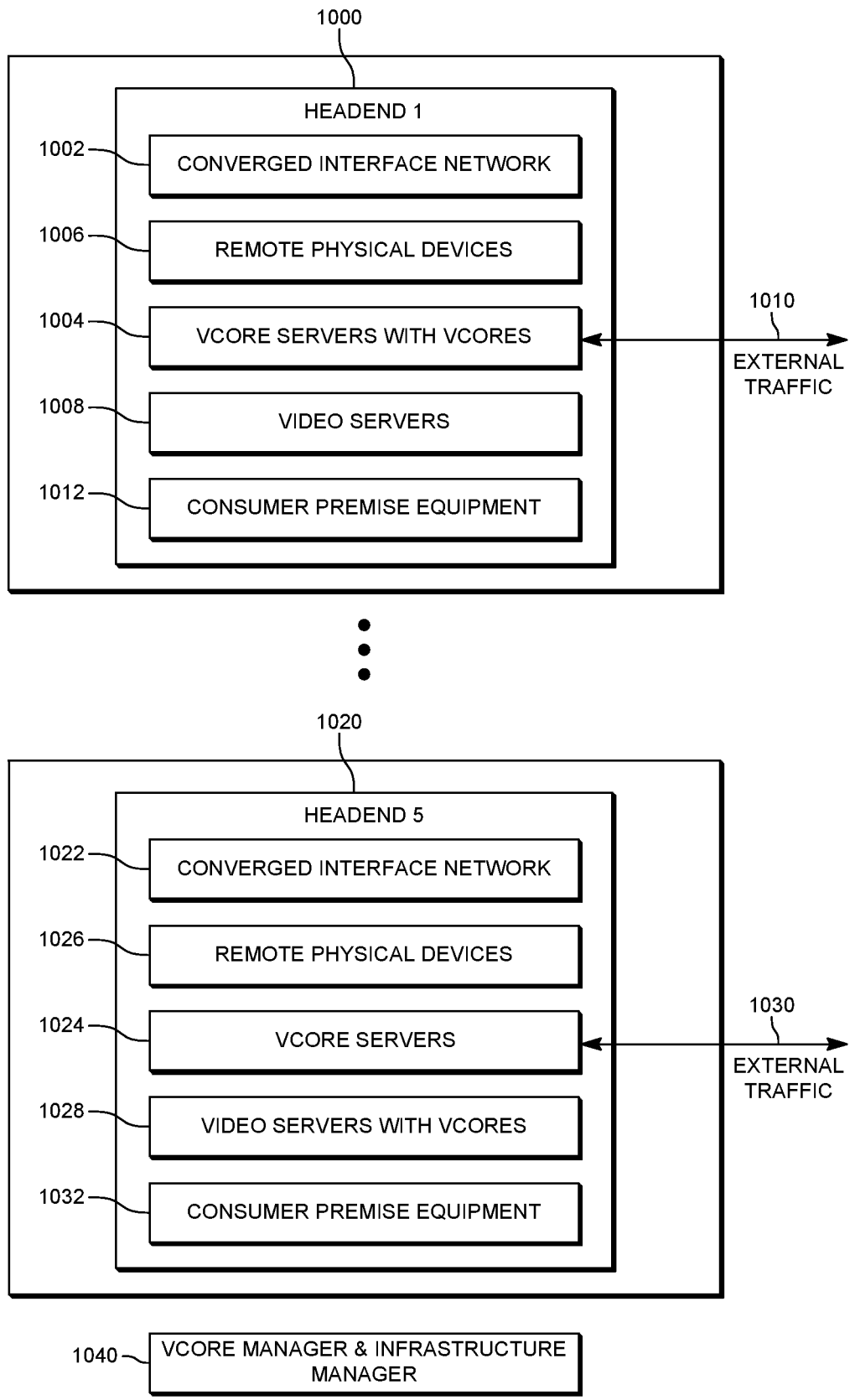
FIG. 10 illustrates multiple headends each with a respective converged interface network.

Referring to FIG. 10, often for a large environment it is desirable to cluster together different headend network configurations to improve the support for the associated devices. A first headend 1000 may include a first converged interface network (CIN) 1002, which includes a network of leaf switches and spine switches. The CIN 1002 is interconnected to a set of vCores (e.g., 9-12) 1004 running on one or more COTS servers and/or "bare metal" servers and/or virtual machines and/or software containers. The vCores 1004 are interconnected to a set of remote physical devices 1006, if desired. A set of one or more video servers 1008 may be included, if desired. The vCores 1004 and/or the RPDs 1006 may be interconnected to the consumer premise equipment 1012, such as a customer's gateway. The CIN 1002 may be interconnected to a public network 1010, such as the Internet. The first converged interface network 1002 of the first headend 1000 may be suitable for supporting 200,000 subscribers.

A second headend 1020 may include a second converged interface network (CIN) 1022, which includes a network of leaf switches and spine switches. The CIN 1022 is interconnected to a set of vCores (e.g., 9-12) 1024 running on one or more COTS servers and/or "bare metal" servers and/or virtual machines and/or software containers. The vCores 1024 are interconnected to a set of remote physical devices 1026, if desired. A set of one or more video servers 1028 may be included, if desired. The vCores 1024 and/or the RPDs 1026 may be interconnected to the consumer premise equipment 1032, such as a customer's gateway. The CIN 1022 may be interconnected to the public network 1030, such as the Internet. The second converged interface network 1022 of the second headend 1020 may be suitable for supporting 400,000 subscribers. The Additional headends may be included, each of which may include additional such converged interface networks and associated devices therewith to support the customers. The headends 1000, 1020 may also include a vCore manager 1040 to manage the vCores, the CINs, the video servers, the RPDs, and the other infrastructure of the headends 1000, 1020. The capacity of the headends 1000, 1020 has increased capacity to carry data to and from the external networks 1010, 1030. The headends are separated from one another by segmentation.

By way of example, each converged interface network may support 9-12 vCore servers. By way of example, each vCore server may support 30 or more vCores. Each vCore may be interconnected to four or more remote physical devices. This arrangement may be suitable for supporting 200,000 subscribers.

Figure 11:
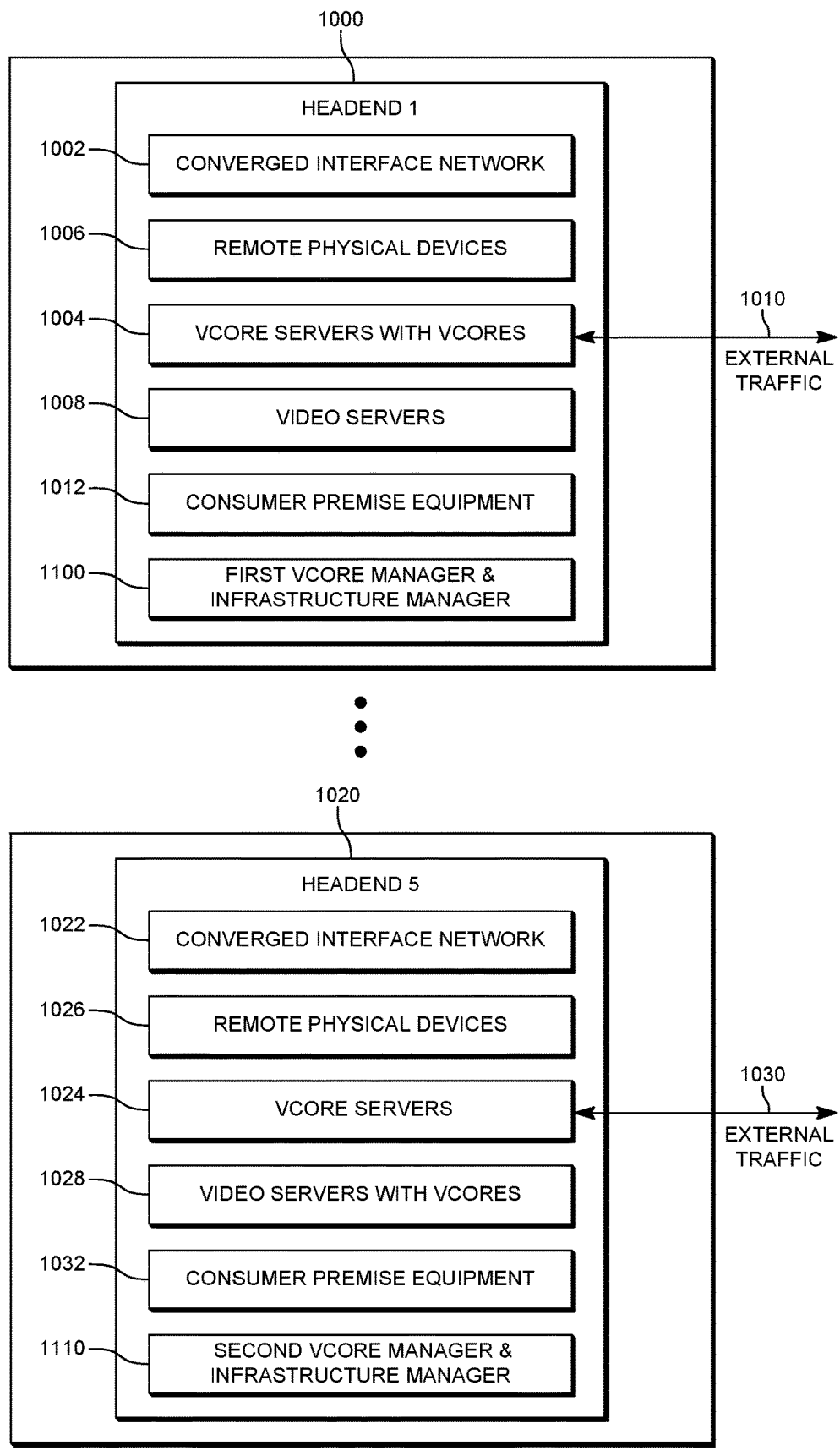
FIG. 11 illustrates multiple headends each with a respective converged interface network and a respective vCore manager and infrastructure manager.

Referring to FIG. 11, a similar architecture to FIG. 10 is illustrated. The headends 1000, 1020 also each include a respective vCore manager 1100, 1110 to manage the respective vCores, the CINs, the video servers, the RPDs, and the other infrastructure of the respective headends 1000, 1020.

The failure detection may be based upon the use of one or more probes. The probe may detect, for example, the lack of data being transmitted, the lack of a response to a ping, the loss of precision time protocol timing synchronization, failure of a microservice in the vCore, ICMP ping of default gateway, NIC link loss, etc. The probe may be included with the monitoring system 600. The monitoring system 600 may be included within a container that is within a pod containing the other vCores, each of which is likewise within a respective container. In addition, the vCores may generate events that indicate a health related issue, such as a data link going down, which is provided to the monitoring system 600. Preferably, the monitoring system 600 determines what action should occur in the event of a failure, such as when to do a failover, how to do a failover, and where to do a failover, which are signaled to the "failed" vCore and/or "failed" server and the "back-up" vCore and/or "back-up" server.

By way of example, with the failure of a single vCore, the system may failover to a "back-up" on a different server or a different core on the same server, depending on available resources.

By way of example, with a failure impacting all the vCores on a server, the system may failover all vCores to "back-up" vCores to one or more other servers, depending on available resources.

By way of example, with a failure of the server, the system may failover the server to a "back-up" server, and failover all the vCores to the "back-up" server, depending on available resources.

By way of example, the monitoring system 600 may permit user initiated failover of a server including the vCores instantiated thereon to another server with the "back-up" vCores instantiated thereon. By way of example, the monitoring system 600 may permit user initiated failover of one or more vCores to the same or another server with the "back-up" vCores instantiated thereon.

The server (COTS server and/or "bare metal" server) may include one or more processors fabricated as an integrated circuit. Each processor is composed of a plurality of separate processing units generally referred to as cores, each of which reads and executes program instructions. Each processor can run instructions on the separate cores at the same time, thereby increasing the overall speed for programs that support multithreading or other parallel computing. To further increase performance, in some processor architectures for each core that is physically present two virtual (i.e., logical) cores may be used. In this manner, concurrent scheduling of the two processes for each logical core may be used. Typically, the virtual cores are achieved by duplication of portions of the processor, those that store the architectural state, but not duplicating the main execution resources.

Due to the real time constraints, the vCores are preferably implemented such that each vCore is assigned its own cores that it doesn't share with other vCores. A vCore supports downstream traffic to consumer premise equipment and supports upstream traffic to the Internet. To ensure that the downstream traffic and the upstream traffic do not result in interfering with the ability to process data in a timely manner, each vCore preferably uses a first core for the upstream traffic and a second core for the downstream traffic. In this manner, the upstream traffic and downstream traffic are effectively isolated from one another. Also, preferably no other processes from other software programs share the cores being used by the vCore. For reference purposes, this vCore configuration may be referred to as a 1-1 vCore (1 core upstream and 1 core downstream). More preferably, the vCore uses logical cores, so that a 1-1 vCore may be supported by a single core. By way of example, a single processor may have 30 physical cores and 60 logical cores. With a vCore using 2 logical cores, the single processor can support up to 30 1-1 vCores.

After consideration of the typical usage by consumer premise equipment, it was determined that the vCore provides more processing and data for the downstream traffic (i.e., the downstream core) than for the upstream traffic (i.e., the upstream core). In this case, the logical core associated with the vCore's upstream data traffic is being underutilized. To accommodate a more balanced usage of the logical cores, the vCore preferably uses a first core for the upstream traffic, and a second and third cores for the downstream traffic. In this manner, the upstream traffic and downstream traffic are effectively isolated from one another. Also, preferably no other processes from other software programs share the cores being used by the vCore. For reference purposes, this vCore configuration may be referred to as a 1-2 vCore (1 core upstream and 2 cores downstream). More preferably, the vCore uses logical cores, so that a 1-2 vCore may be supported on one and a half cores. By way of example, a single processor may have 30 physical cores and 60 logical cores. With a vCore using 3 logical cores, the single processor can support up to 20 1-2 vCores. Also, the 1-2 vCores are suitable to support a larger number of subscribers than a 1-1 vCore, while making better utilization of the processing capabilities of the processor.

Each of the vCores may use any suitable number of cores for the upstream data traffic and any suitable number of cores for the downstream data traffic. Preferably, the number of cores for the upstream data traffic of a vCore is less than or equal to the number of cores for the downstream data traffic. Also, vCores are preferably implemented such that each vCore is assigned its own cores that it doesn't share with other vCores, and in the case of logical cores the vCores are preferably implemented such that each vCore is assigned its own logical cores that it doesn't share with other vCores, although one core may have a logical core used by a first vCore and a second logical core used by a second vCore.

Figure 12:
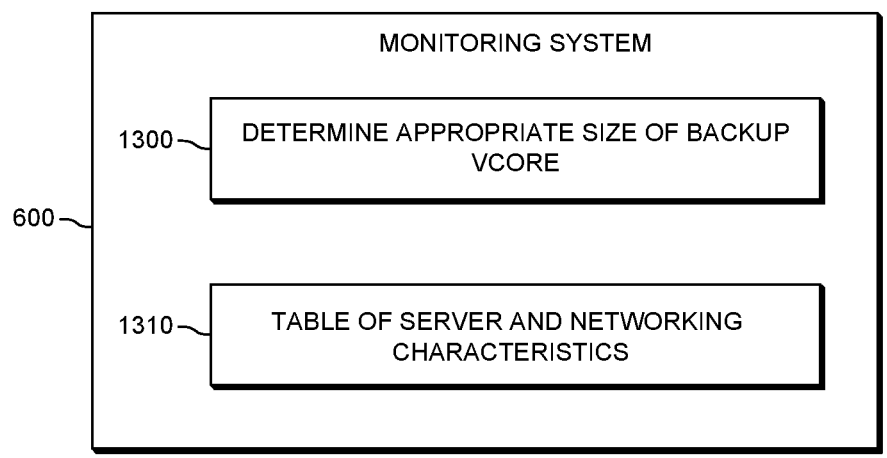
FIG. 12 illustrates a monitoring system.

Referring to FIG. 12, the monitoring system 600 may determine the appropriate size for a backup vCore 1300, in terms of the cores and/or logical cores used, to replace a failed vCore. Preferably the monitoring system 600 replaces a failed $x_1$-$y_1$ vCore with another $x_2$-$y_2$ vCore using the same number of cores and/or logical cores x-y. Also, the monitoring system 600 may replace a failed $x_1$-$y_1$ vCore with another $x_2$-$y_2$ vCore having a greater number of cores and/or logical cores, for either the downstream traffic, the upstream traffic, or both. Preferably, the monitoring system 600 prohibits the replacement of a failed $x_1$-$y_1$ vCore with another $x_2$-$y_2$ vCore having a smaller number of cores and/or logical cores, for either the downstream traffic, the upstream traffic, or both. Preferably, the monitoring system 600 prohibits the replacement of a failed vCore with more than one other vCore.

The underlying server hardware has a tendency to have different characteristics for each core, as older "failed" server hardware is replaced with newer "back-up" sever hardware. Often, the computational capacity and/or networking capability of each core and logical core increases with newer "back-up" server hardware. The monitoring system 600 may include a table of core and/or logical core characteristics and/or networking capability 1310 that interrelate the performance of the vCore to that of one or more cores of the server and/or networking capability. In this manner, the monitoring system 600 may determine whether a newer "back-up" server hardware has at least the same computational capacity and/or networking capability of each core and/or logical core as the "failed" server, prior to replacing the failed server with the back-up server. In addition, preferably the monitoring system 600 prohibits replacing the "failed" server with the "back-up" server if the computational capacity and/or networking capability of each core and/or logical core of the "back-up" server is less than that of the "failed" server.

The table of core and/or logical core characteristics may be determined in any suitable manner and included in the table. Also, a characterization program may be included in the vCore to determine a value related to the core and/or logical core characteristics for each core, logical core, processor, and/or server.

The monitoring software 600 may also perform in-service software updates for the vCores, where the software of an operational vCore is to be updated. Rather than updating the software of the vCore, a "back-up" vCore may be instantiated with the updated software. A portion of the configuration information may be loaded onto the "back-up" vCore. Thereafter, with the configuration information suitably included on the "back-up" vCore, the monitoring system 600 may "shut down" the vCore to be updated, preferably shortly after performing a checkpointing operation. The "back-up" vCore will then become the "active vCore", the remaining configuration information is loaded onto the vCore together with any checkpointed information. In this manner, the mechanism that is used to manage "failed" vCores may likewise be used, at least in part, to manage the in-service software updates.

Figure 13:
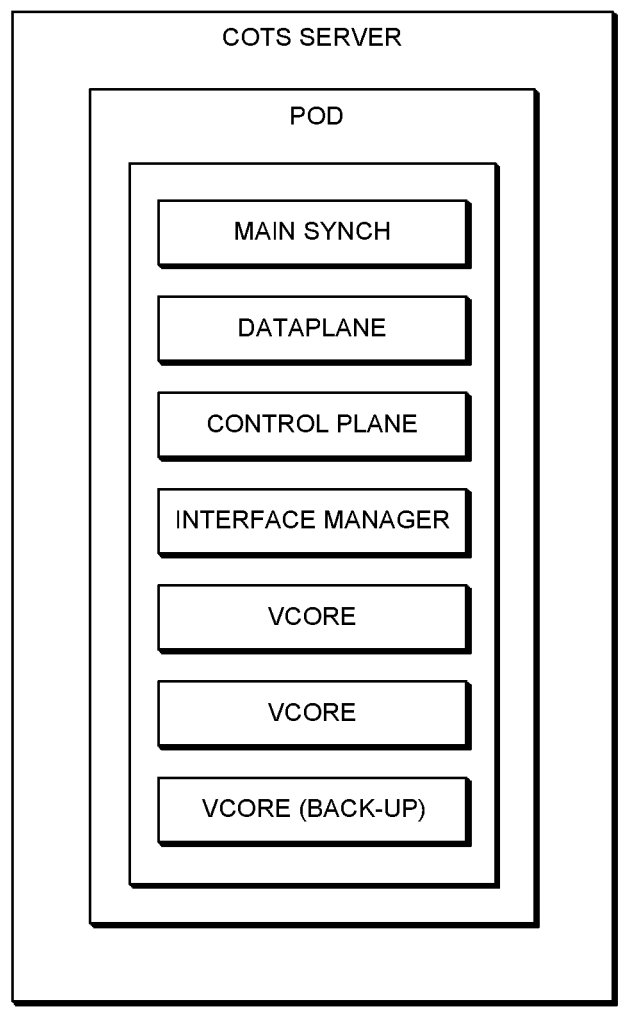
FIG. 13 illustrates a pod with a main synchronization container, a data plane container, a control plane container, an interface manager, and vCore containers.

Referring to FIG. 13, the vCore host may include a POD of containerized components. For example, one of the components may include a main synchronization container. For example, other components may include a control plane container, a data plane container, an interface manager, and a set of vCore containers, etc. In order for the containers to properly function, it is desirable for the main synchronization container to manage the synchronizations of when each container becomes operational. For example, the data plane container needs to be functional before the vCore container becomes operational. Other interrelationships exist in the synchronization of the containers being started so that the system is initialized in an effective manner.

Figure 14:
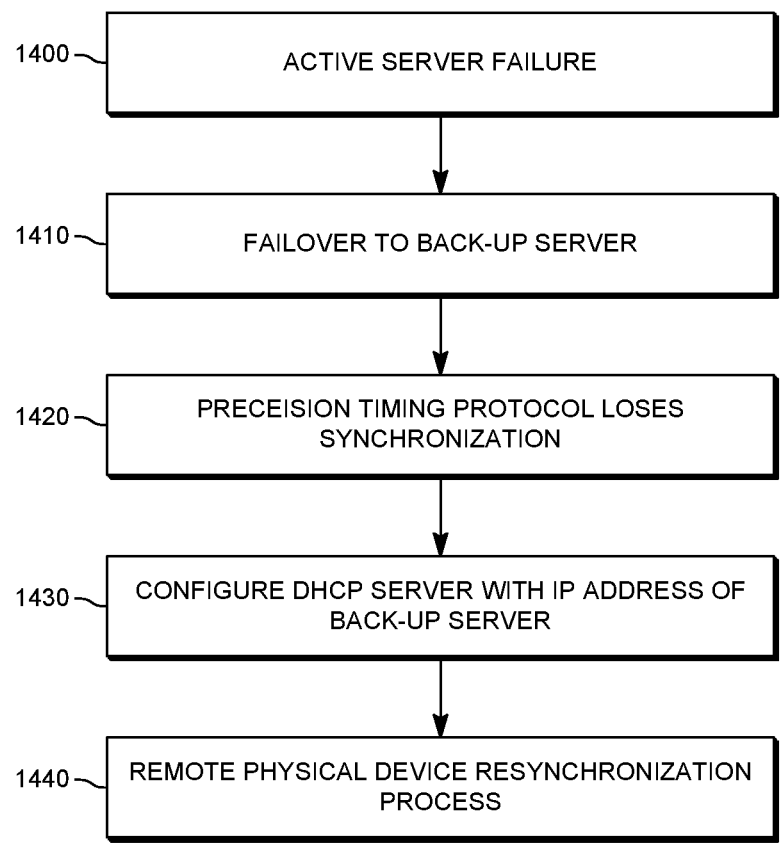
FIG. 14 illustrates a failover of a cable network with remote physical devices of an active server to a back-up server based upon a DHCP server.

Referring to FIG. 14, in the case of a distributed access architecture where the remote physical device includes at least remote physical layer processing, the complexities associated with a fail over of a vCore and/or a server that hosts a set of one or more vCores is increasingly complicated. By way of example, when an active server fails 1400 the managing system 600 may failover the active server and the vCores instantiated thereon to a back-up server 1410. The checkpointing and/or configuration data is provided to the back-up server and/or the back-up vCores, as previously described. During the failover process the precision timing protocol timing between the failed active server and the remote physical devices loses their synchronization 1420, and the managing system 600 configures a dynamic host configuration protocol server with the Internet protocol address of the back-up server 1430. When the remote physical device loses its IP connectivity to the vCore (e.g., due to vCore failure), then after a timeout period the remote physical device reboots. During the rebooting processing the remote physical device makes a request to a DHCP server 1140 and requests for the back-up server IP addresses before establishing a connection. In another manner, the remote physical device loses its IP connectivity to the vCore (due to vCore failure). The management system may have instantiated another vCore with the same IP address (and configuration). In this manner, the remote physical device establishes a connection (being unaware of the new vCore) with the new vCore with the same IP address and this does not result in a reboot process. In general, the remote physical devices then interconnects and resynchronizes the precision timing protocol with the back-up server including the vCores. This process occurs, generally in parallel, for each of the remote physical devices associated with the failed active server and/or vCores. This process may take several minutes to complete, while the service to the customer is interrupted.

To decrease the time for an active server and/or vCores to failover to a back-up server and/or vCores, especially in the case of a distributed access architecture, it is desirable to checkpoint selected additional system level configuration data. The system level configuration data may include log information from the active servers, active vCores, and/or active remote physical devices. The system level configuration data may include alarm related information, such as timing of active vCores failing, failed vCores starting, and error messaging between the vCores and the associated remote physical devices. The system level configuration data may include a network element inventory, such as identification (e.g., by name and/or IP address) of each of the remote physical devices associated with each vCore, configuration parameters of each of the remote physical devices associated with each vCore, the configuration parameters of each vCore related to the remote physical devices, session_id used for the DEPI and UEPI channels used between the vCores and the remote physical devices, IP addresses of the consumer premises equipment devices attached to the remote physical devices, and packet counter values used in data flows between the vCore and the remote physical device. The system level configuration data is preferably checkpointed on a periodic basis for configuring a back-up server and/or vCores. The system level configuration information is preferably checkpointed at a lower frequency than the other checkpointed information and/or configuration data.

Figure 15:
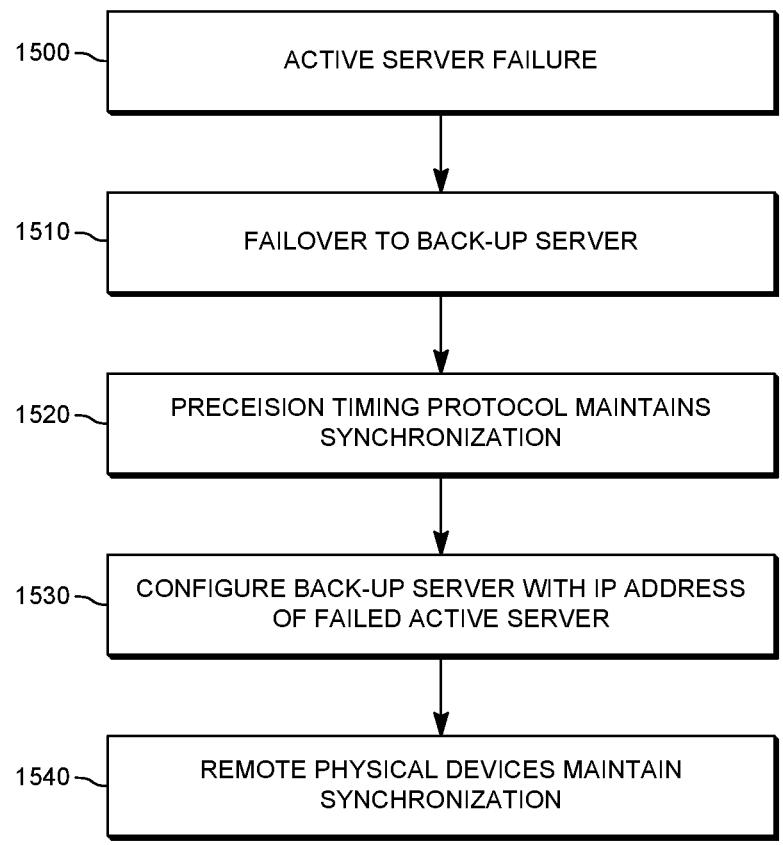
FIG. 15 illustrates a failover of a cable network with remote physical devices of an active server to a back-up server with insubstantial service interruption.

Referring to FIG. 15, to reduce the time for a failover from a failed active server and/or vCores 1500 to a back-up server and/or vCores 1510, the back-up server and/or the vCores are already instantiated. Also, the back-up server and/or vCores may be at least partially configured based upon the system level configuration data, checkpointed information, and/or configuration data. Also, with the backup server and/or vCores already operational, during the failover process the precision timing protocol timing between the failover back-up server and the remote physical devices does not lose their synchronization 1520, and the back-up server is provided with the IP address of the failed active server and/or vCores 1530. In some cases, the precision timing protocol synchronization may be lost for a limited duration. In this manner, the remote physical devices will not need to enter into a resynchronization process, or otherwise a rebooting process, nor request the IP address of the designated server from the dynamic host configuration protocol server. The remote physical devices remain synchronized with the back-up server for the server and/or vCores 1540. This process occurs, generally in parallel, for each of the remote physical devices associated with the failed active server. This process may be completed with no, or insubstantial, interruption of service to the customers.

Figure 16:
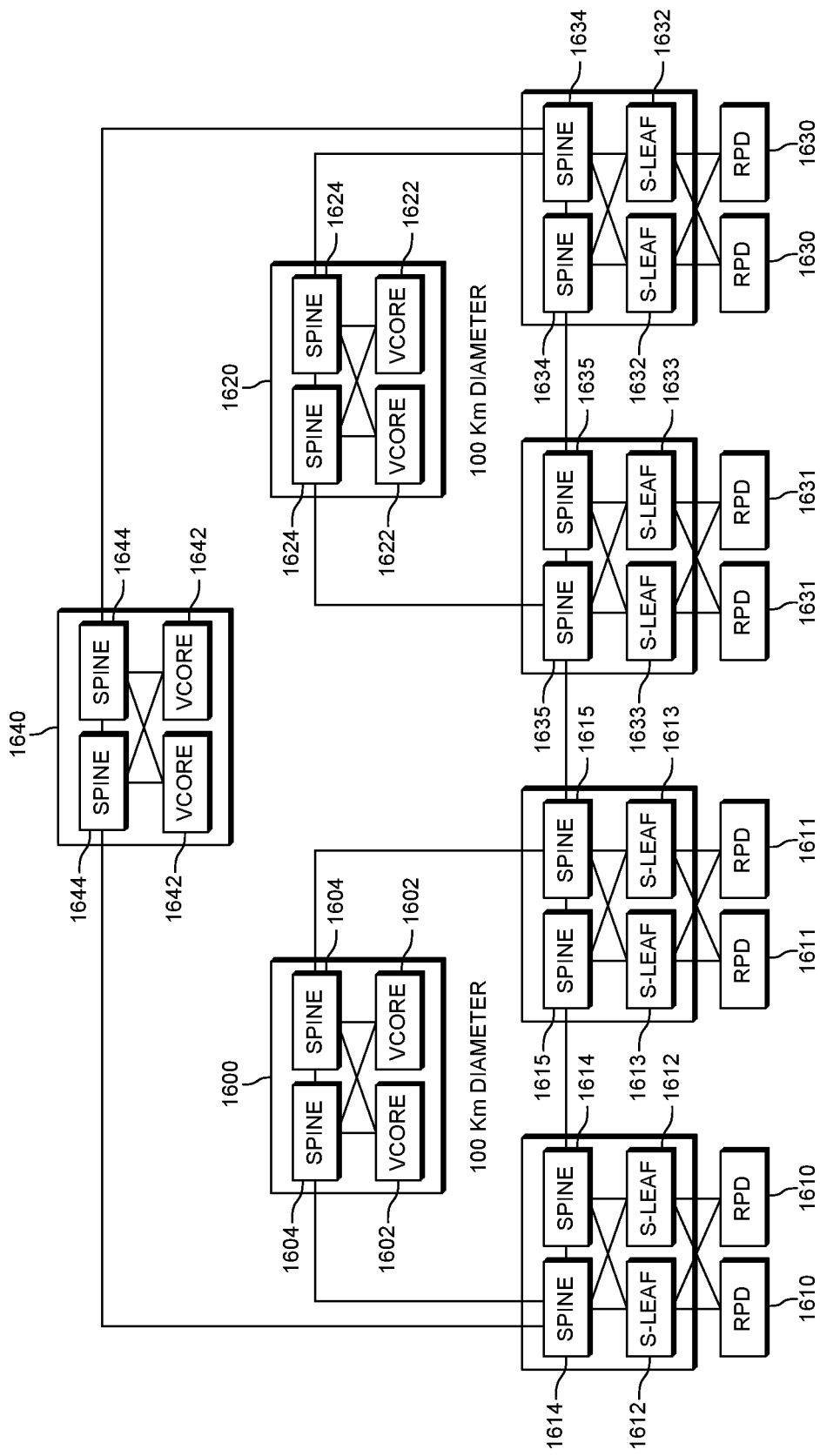
FIG. 16 illustrates vCores deployed on servers.

Referring to FIG. 16, a cable system may include a first server 1600 that includes a plurality of vCores 1602 and a plurality of spine switches 1604. The first server 1600 may be interconnected to a first set of remote physical devices 1610 through a set of leaf switches 1612 and a set of spine switches 1614. The remote physical devices 1610 are interconnected to a set of consumer premise equipment. The first server 1600 may be interconnected to a second set of remote physical devices 1611 through a set of leaf switches 1613 and a set of spine switches 1615. The remote physical devices 1611 are interconnected to a set of consumer premise equipment. The cable system may include a second server 1620 that includes a plurality of vCores 1622 and a plurality of spine switches 1624. The second server 1620 may be interconnected to a third set of remote physical devices 1630 through a set of leaf switches 1632 and a set of spine switches 1634. The remote physical devices 1630 are interconnected to a set of consumer premise equipment. The second server 1620 may be interconnected to a fourth set of remote physical devices 1631 through a set of leaf switches 1633 and a set of spine switches 1635. The remote physical devices 1631 are interconnected to a set of consumer premise equipment. The first server 1600 and the second server 1620 may be geographically remotely located from one another. A third back-up server may be included with 1640 that includes a plurality of vCores 1642 and a plurality of spine switches 1644. The first server 1600 may be interconnected to a first set of remote physical devices 1610 through a set of leaf switches 1612 and a set of spine switches 1614. The third server 1640 may be geographically remotely located from the first server 1600 and/or the second server 1620.

Referring to FIG. 16, it is desirable to deploy vCores on multiple servers arranged as a server cluster which acts as a unified group of servers, which may serve as a single entity to provide higher availability, load balancing, and system scalability. When the deployment of vCores on the servers is relatively minimal it is typically relatively straightforward to provide a sufficient number of redundant vCores to provide sufficient failover. However, when a server exceeds around 80% core utilization and/or virtual core utilization, and more preferably exceeds around 90% core utilization and/or virtual core utilization, it becomes increasingly difficult to provide effective utilization of the core and/or virtual core of the servers, together with sufficient redundancy, while maintaining a minimal number of servers. To most effectively use a cluster of servers, it is often desirable to utilize each server to near its maximum capacity.

In the event that the first server 1600 fails, or a vCore 1602 on the first server 1600 fails, either of which are synchronized with the remote physical devices 1610, the third server 1640 may be used as a backup server, or a back-up vCore 1642 on the third server 1640, to provide the failover back-up services to the remote physical devices 1610. This failover maybe managed by a managing system 600.

By way of example, the geographically remote distance may be 5 miles or more, 20 miles or more, 100 miles or more, such as between any selected servers. The interconnection between the various servers preferably use a dedicated network for the cable networking system, rather than the public Internet. In this manner, the network through which the servers are interconnected.

As previously described some vCores may have a single upstream core and may have a single downstream core, generally referred to herein as 1-1 vCores. In this manner, the server cluster should provide redundancy for such 1-1 vCores. As previously described some vCores may have a single upstream core and have two downstream cores, generally referred to herein as 1-2 vCores. In this manner, the server cluster should provide redundancy for such 1-2 vCores. Other arrangements of x-y vCores may likewise be used, as desired, together with the server cluster providing redundancy for such x-y vCores. In addition, each of the 1-1 vCores may include the same or different versions of software thereon (e.g., software version A, software version B, etc.). Further, each of the 1-2 vCores may include the same or different versions of software thereon (e.g., software version C, software version D, etc.). Moreover, each of the x-y vCores may include the same or different versions of software thereon (e.g., software version E, software version F, etc.).

The managing system 600 may be provided with or otherwise select a redundancy level (N). In a system with a redundancy level N, there is 1 redundant vCore for every N active vCores or portion thereof. A pre-deployed vCore is one which has been deployed onto a host and is operational but not fully configured. A pre-deployed vCore may be used as a redundant vCore or may be used as a new active vCore. The redundant vCore may be a pre-deployed vCore that is reserved in the event of a failover. Pre-deployed vCores may be marked as redundant which are moved into an active vCore when replacing services of a failed active vCore. An active vCore is a vCore providing services for customers. The loss of an active vCore may result in service down time for the customers. For example, with a redundancy level of N=3 there is 1 redundant vCore for every 3 active vCores; with a redundancy level of N=4 there is 1 redundant vCore for every 4 active vCores. Further, to achieve host level redundancy, there is N+1 hosts in the server cluster. The examples that follow are based upon a processor on a server having 32 cores and 64 logical cores. Other servers with a different number of cores may be used, with or without logical cores. As previously noted, a 1-1 vCore uses two logical cores on the same server for a vCore. As previously noted, a 1-2 vCore uses three logical cores on the same server for a vCore.

Example 1

Example 1: consider a deployment with the following characteristics:
 4 servers of which 3 servers are allocated to active vCores and 1 server is allocated to redundant vCores;
 N=3 indicating a 3 to 1 redundant vCore;
 2 different types of vCores, namely 1-1 vCores and 1-2 vCores.

The allocation of 1-1 vCores and 1-2 vCores may be as follows:

| Server 1 | 32 1-1 vCores | 0 1-2 vCores | (64 logical cores) |
| Server 2 | 0 1-1 vCores | 21 1-2 vCores | (63 logical cores) |
| Server 3 | 23 1-1 vCores | 6 1-2 vCores | (64 logical cores) |

The 3 to 1 redundancy, together with ceil(x), results in the following required redundant 1-1 vCores and 1-2 vCores:
 19 redundant 1-1 vCores (ceil(55/3)) 9 redundant 1-2 vCores (ceil(27/3))

With 19 redundant 1-1 vCores (38 logical cores) and 9 redundant 1-2 vCores (27 logical cores) the total is 65 logical cores which is more than available on server 4 allocated to redundant vCores. The spare logical core on server 2 is unavailable for the redundancy because logical cores for a single vCore cannot be spread across servers. Accordingly, this arrangement fails to provide the required redundancy of 3 to 1 across 4 servers, even though it would have appeared that there were a sufficient number of logical cores.

Example 2

Example 2: consider a deployment with the following characteristics:
  4 servers of which 3 servers are allocated to active vCores and 1 server is allocated to redundant vCores;
  N=3 indicating a 3 to 1 redundant vCore;
  2 different types of vCores, namely 1-1 vCores and 1-2 vCores.
The allocation of 1-1 vCores and 1-2 vCores may be as follows:

| Server 1 | 32 1-1 vCores | 0 1-2 vCores  | (64 logical cores) |
| Server 2 | 0 1-1 vCores  | 20 1-2 vCores | (60 logical cores) |
| Server 3 | 23 1-1 vCores | 6 1-2 vCores  | (64 logical cores) |

The 3 to 1 redundancy, together with ceil(x), results in the following required redundant 1-1 vCores and 1-2 vCores:
  19 redundant 1-1 vCores (ceil(55/3)) 9 redundant 1-2 vCores (ceil(26/3))
With 19 redundant 1-1 vCores (38 logical cores) and 9 redundant 1-2 vCores (27 logical cores) the total is 65 logical cores which is available on server 4 allocated to redundant vCores together with server 2 having 4 remaining logical cores. The spare logical cores on server 2 may accommodate 2 1-1 vCores for a total of 64 logical cores, and server 4 may accommodate 17 1-1 vCores and 9 1-2 vCores. Accordingly, this arrangement provides the required redundancy of 3 to 1 across 4 servers.

Example 3

Example 3: consider a deployment with the following characteristics:
  4 servers of which 3 servers are allocated to active vCores and 1 server is allocated to redundant vCores;
  N=3 indicating a 3 to 1 redundant vCore;
  2 different types of vCores, namely 1-1 vCores and 1-2 vCores.
The allocation of 1-1 vCores and 1-2 vCores may be as follows:

| Server 1 | 32 1-1 vCores | 0 1-2 vCores  | (64 logical cores) |
| Server 2 | 2 1-1 vCores  | 20 1-2 vCores | (64 logical cores) |
| Server 3 | 23 1-1 vCores | 6 1-2 vCores  | (64 logical cores) |

The 3 to 1 redundancy, together with ceil(x), results in the following required redundant 1-1 vCores and 1-2 vCores:
  19 redundant 1-1 vCores (ceil(55/3)) 9 redundant 1-2 vCores (ceil(26/3))
With 19 redundant 1-1 vCores (38 logical cores) and 9 redundant 1-2 vCores (27 logical cores) the total is 65 logical cores which is more than available on server 4 allocated to redundant vCores. There are no spare logical cores on the 1st, 2nd, nor 3rd server. Accordingly, this arrangement fails to provide the required redundancy of 3 to 1 across 4 servers.

Example 4

Example 4: consider a deployment with the following characteristics:
  4 servers of which 3 servers are allocated to active vCores and 1 server is allocated to redundant vCores;
  N=3 indicating a 3 to 1 redundant vCore;
  2 different types of vCores, namely 1-1 vCores and 1-2 vCores.
The allocation of 1-1 vCores and 1-2 vCores may be as follows:

| Server 1 | 27 1-1 vCores | 3 1-2 vCores  | (63 logical cores) |
| Server 2 | 17 1-1 vCores | 10 1-2 vCores | (64 logical cores) |
| Server 3 | 9 1-1 vCores  | 15 1-2 vCores | (63 logical cores) |

The 3 to 1 redundancy, together with ceil(x), results in the following required redundant 1-1 vCores and 1-2 vCores:
  18 redundant 1-1 vCores (ceil(53/3)) 10 redundant 1-2 vCores (ceil(28/3))
With 18 redundant 1-1 vCores (36 logical cores) and 10 redundant 1-2 vCores (30 logical cores) the total is 66 logical cores which is more than available on server 4 allocated to redundant vCores. The spare logical cores on servers 1 and 3 are unavailable for the redundancy because logical cores for a single vCore cannot be spread across servers. Accordingly, this arrangement fails to provide the required redundancy of 3 to 1 across 4 servers.

Example 5

Example 5: consider a deployment with the following characteristics:
  4 servers of which 3 servers are allocated to active vCores and 1 server is allocated to redundant vCores;
  N=3 indicating a 3 to 1 redundant vCore;
  2 different types of vCores, namely 1-1 vCores and 1-2 vCores.
The allocation of 1-1 vCores and 1-2 vCores may be as follows:

| Server 1 | 27 1-1 vCores | 3 1-2 vCores  | (63 logical cores) |
| Server 2 | 18 1-1 vCores | 9 1-2 vCores  | (63 logical cores) |
| Server 3 | 9 1-1 vCores  | 15 1-2 vCores | (63 logical cores) |

The 3 to 1 redundancy, together with ceil(x), results in the following required redundant 1-1 vCores and 1-2 vCores:
  18 redundant 1-1 vCores (ceil(54/3)) 9 redundant 1-2 vCores (ceil(27/3))
With 18 redundant 1-1 vCores (36 logical cores) and 9 redundant 1-2 vCores (30 logical cores) the total is 63 logical cores which is available on server 4 allocated to redundant vCores. It is noted that the allocation of vCores is limited to groups of 3 (i.e., the redundancy factor), which eliminates the rounding associated with redundancy to make better usage of the redundant vCores. Accordingly, this arrangement provides the required redundancy of 3 to 1 across 4 servers.

Example 6

Example 6: consider a deployment with the following characteristics:
 4 servers of which 3 servers are allocated to active vCores and 1 server is allocated to redundant vCores;
 N=3 indicating a 3 to 1 redundant vCore;
 2 different types of vCores, namely 1-1 vCores and 1-2 vCores.

The allocation of 1-1 vCores and 1-2 vCores may be as follows:

| | | | |
|---|---|---|---|
| Server 1 | 21 1-1 vCores | 7 1-2 vCores | (63 logical cores) |
| Server 2 | 12 1-1 vCores | 13 1-2 vCores | (63 logical cores) |
| Server 3 | 30 1-1 vCores | 1 1-2 vCores | (63 logical cores) |

The 3 to 1 redundancy, together with ceil(x), results in the following required redundant 1-1 vCores and 1-2 vCores:
 21 redundant 1-1 vCores (ceil(63/3)) 7 redundant 1-2 vCores (ceil(21/3))

With 21 redundant 1-1 vCores (42 logical cores) and 7 redundant 1-2 vCores (21 logical cores) the total is 63 logical cores which is available on server 4 allocated to redundant vCores. It is noted that the allocation of vCores is limited to groups of 3 (i.e., the redundancy factor), which eliminates the rounding associated with redundancy to make better usage of the redundant vCores. Accordingly, this arrangement provides the required redundancy of 3 to 1 across 4 servers.

The allocation of vCores, especially in groups correlating to the redundancy factor tends to increase the effective allocation of resources on a server cluster.

While some of the aforementioned examples provide a sufficient number of redundant vCores based upon a redundancy factor, they fail to address a failure scenario where an entire server fails. While example 6 illustrates that the server cluster can host the overall number of redundant vCores necessary on a single server, but the vCores are distributed in such a fashion that the server cluster cannot guarantee a server failure can be fully serviced. As illustrated in example 6, if server 1 fails the system is perfectly matched with server 4 redundant vCores. However, if server 2 or server 3 fails the server cluster cannot meet the redundancy requirements. As illustrated, if server 2 fails the server cluster would require 13 1-2 vCores to be available but server 4 only has 7 1-2 vCores. As illustrated, if server 3 fails the server cluster would require 30 small vCores to be available but server 4 only has only 21 1-1 vCores. On an aggregate basis there are a sufficient number of vCores, but for the case of any specific server it may not meet the case for full redundancy. Similar situations arise in examples 2 and 5.

In the case that it is desirable to include server failover redundancy, it is desirable to distribute the vCores across the servers in the cluster using a relatively even distribution. In this manner, any single server does not become overloaded with any particular vCore type creating an imbalance in the overall server cluster. One technique to provide a sufficiently distributed vCore distribution across the server cluster is to first allocate a first redundant vCore having a first size (e.g., 1-1 vCore) with a first software version at the opposite end of the server list from the active vCore, then the order of deployment should be reverse the order of deployment for the active vCores. Next, allocate a second redundant vCore having the first size (e.g., 1-1 vCore) with the first software version on the next server, then distribute the set of vCores having the first size (e.g., 1-1 vCore) with the first software version on the remaining servers. Next, allocate a third redundant vCore having the first size (e.g., 1-1 vCore) with the first software version on the next server, then distribute the set of vCores having the first size (e.g., 1-1 vCore) with the first software version on the remaining servers. This process is repeated until all of the vCores having the first size with the first software version are distributed across the server cluster.

The vCore distribution across the server cluster may next allocate a first redundant vCore having the first size (e.g., 1-1 vCore) with a second software version on the first server, then distribute the set of vCores having the first size (e.g., 1-1 vCore) with the second software version on the remaining servers (in the case of N+1 servers). Next, allocate a second redundant vCore having the first size (e.g., 1-1 vCore) with the second software version on the second server, then distribute the set of vCores having the first size (e.g., 1-1 vCore) with the second software version on the remaining servers. Next, allocate a third redundant vCore having the first size (e.g., 1-1 vCore) with the second software version on the third server, then distribute the set of vCores having the first size (e.g., 1-1 vCore) with the second software version on the remaining servers. This process is repeated until all of the vCores having the first size with the second software version are distributed across the server cluster.

The vCore distribution across the server cluster may next allocate a first redundant vCore having a second size (e.g., 1-2 vCore) with a third software version on the first server, then distribute the set of vCores having the second size (e.g., 1-2 vCore) with the third software version on the remaining servers (in the case of N+1 servers). Next, allocate a second redundant vCore having the second size (e.g., 1-2 vCore) with the third software version on the second server, then distribute the set of vCores having the second size (e.g., 1-1 vCore) with the third software version on the remaining servers. Next, allocate a third redundant vCore having the second size (e.g., 1-2 vCore) with the third software version on the third server, then distribute the set of vCores having the second size (e.g., 1-2 vCore) with the third software version on the remaining servers. This process is repeated until all of the vCores having the second size with the third software version are distributed across the server cluster.

The vCore distribution across the server cluster may next allocate a first redundant vCore having the second size (e.g., 1-2 vCore) with a fourth software version on the first server, then distribute the set of vCores having the second size (e.g., 1-1 vCore) with the fourth software version on the remaining servers (in the case of N+1 servers). Next, allocate a second redundant vCore having the second size (e.g., 1-1 vCore) with the forth software version on the second server, then distribute the set of vCores having the second size (e.g., 1-2 vCore) with the fourth software version on the remaining servers. Next, allocate a third redundant vCore having the second size (e.g., 1-2 vCore) with the fourth software version on the third server, then distribute the set of vCores having the second size (e.g., 1-2 vCore) with the fourth software version on the remaining servers. This process is repeated until all of the vCores having the second size with the fourth software version are distributed across the server cluster.

This process may be repeated for each of the vCore sizes and/or this process may be repeated for each of the software combinations. It is to be understood, that any order of deployment may be used for different sized vCores with any software therein (e.g., 1-2 vCores software version B, followed by 1-1 vCores software version C, followed by 1-2 vCores software version A).

Between each of the different vCore sizes and/or software versions, the system may restart allocation at the first server, or allocation at a different server in the server cluster (e.g., the next server).

Example 7

Example 7: consider a deployment with the following characteristics:
  3 servers of which are allocated to active vCores and redundant vCores;
  N=2 indicating a 2 to 1 redundant vCore;
  2 different types of vCores, namely 1-1 vCores and 1-2 vCores.
The allocation of 1-1 vCores and 1-2 vCores may be as follows:

| Server 1 | 10 1-1 vCores | 8 1-2 vCores | Active |
| | 4 1-1 vCores | 4 1-2 vCores | Redundant |
| | | | (64 logical cores) |
| Server 2 | 9 1-1 vCores | 8 1-2 vCores | Active |
| | 5 1-1 vCores | 4 1-2 vCores | Redundant |
| | | | (64 logical cores) |
| Server 3 | 9 1-1 vCores | 8 1-2 vCores | Active |
| | 5 1-1 vCores | 4 1-2 vCores | Redundant |
| | | | (64 logical cores) |

The 2 to 1 redundancy, together with ceil(x), results in the following required redundant 1-1 vCores and 1-2 vCores:
  14 redundant 1-1 vCores (ceil(28/2)) 12 redundant 1-2 vCores (ceil(24/2))

With 14 redundant 1-1 vCores (28 logical cores) and 12 redundant 1-2 vCores (36 logical cores) the total is 64 logical cores which is available on server cluster allocated to redundant vCores. It is noted that the allocation of vCores is limited to groups of 2 (i.e., the redundancy factor), which eliminates the rounding associated with redundancy to make better usage of the redundant vCores. Accordingly, this arrangement provides the required redundancy of 2 to 1 across 3 servers. Further, for any host failure, the redundant vCores are spread in sufficient fashion that they may cover the number of active vCores from the failed server. For example, if server 1 fails, 10 active vCores 1-1 can be made available from server 2 and server 3 redundant vCores 1-1 (5 each). Also, if the system loses 8 active vCores 1-2, they can be covered by the 4 redundant vCores 1-2 on each of the servers 2 and 3. In this example, the utilization is 100% for the fully loaded server cluster.

Example 8

Example 8: consider a deployment with the following characteristics:
  3 servers of which are allocated to active vCores and redundant vCores;
  N=2 indicating a 2 to 1 redundant vCore;
  2 different types of vCores, namely 1-1 vCores and 1-2 vCores.
The allocation of 1-1 vCores and 1-2 vCores may be as follows:

| Server 1 | 4 1-1 vCores | 12 1-2 vCores | Active |
| | 1 1-1 vCores | 6 1-2 vCores | Redundant |
| | | | (64 logical cores) |
| Server 2 | 3 1-1 vCores | 12 1-2 vCores | Active |
| | 2 1-1 vCores | 6 1-2 vCores | Redundant |
| | | | (64 logical cores) |
| Server 3 | 2 1-1 vCores | 12 1-2 vCores | Active |
| | 2 1-1 vCores | 6 1-2 vCores | Redundant |
| | | | (64 logical cores) |

The 2 to 1 redundancy, together with ceil(x), results in the following required redundant 1-1 vCores and 1-2 vCores:
  5 redundant 1-1 vCores (ceil(10/2)) 18 redundant 1-2 vCores (ceil(36/2))

With 5 redundant 1-1 vCores (10 logical cores) and 18 redundant 1-2 vCores (54 logical cores) the total is 64 logical cores which is available on server cluster allocated to redundant vCores. It is noted that the allocation of vCores is limited to groups of 2 (i.e., the redundancy factor), which eliminates the rounding associated with redundancy to make better usage of the redundant vCores. Accordingly, this arrangement provides the required redundancy of 2 to 1 across 3 servers. Further, for any host failure, the redundant vCores are spread in sufficient fashion that they may cover the number of active vCores from the failed server. For example, if server 1 fails, 4 active vCores 1-1 can be made available from server 2 and server 3 redundant vCores 1-1 (2 each). Also, if the system loses 12 active vCores 1-2, they can be covered by the 6 redundant vCores 1-2 on each of the servers 2 and 3. In this example, the utilization is 100% for the fully loaded server cluster.

Example 9

Example 9: consider a deployment with the following characteristics:
  5 servers of which are allocated to active vCores and redundant vCores;
  N=4 indicating a 4 to 1 redundant vCore;
  2 different types of vCores, namely 1-1 vCores and 1-2 vCores.
The allocation of 1-1 vCores and 1-2 vCores may be as follows:

| Server 1 | 10 1-1 vCores | 11 1-2 vCores | Active |
| | 2 1-1 vCores | 2 1-2 vCores | Redundant |
| | | | (63 logical cores) |
| Server 2 | 10 1-1 vCores | 11 1-2 vCores | Active |
| | 2 1-1 vCores | 2 1-2 vCores | Redundant |
| | | | (63 logical cores) |
| Server 3 | 10 1-1 vCores | 10 1-2 vCores | Active |
| | 2 1-1 vCores | 3 1-2 vCores | Redundant |
| | | | (63 logical cores) |
| Server 4 | 9 1-1 vCores | 10 1-2 vCores | Active |
| | 3 1-1 vCores | 3 1-2 vCores | Redundant |
| | | | (63 logical cores) |
| Server 5 | 9 1-1 vCores | 10 1-2 vCores | Active |
| | 3 1-1 vCores | 3 1-2 vCores | Redundant |
| | | | (63 logical cores) |

The 4 to 1 redundancy, together with ceil(x), results in the following required redundant 1-1 vCores and 1-2 vCores:
  12 redundant 1-1 vCores (ceil(48/4)) 13 redundant 1-2 vCores (ceil(52/4))

With 12 redundant 1-1 vCores (24 logical cores) and 13 redundant 1-2 vCores (39 logical cores) the total is 63 logical cores which is available on server cluster allocated to redundant vCores. It is noted that the allocation of vCores is limited to groups of 4 (i.e., the redundancy factor), which eliminates the rounding associated with redundancy to make better usage of the redundant vCores. Accordingly, this arrangement provides the required redundancy of 4 to 1 across 5 servers. Further, for any host failure, the redundant vCores are spread in sufficient fashion that they may cover the number of active vCores from the failed server. In this example, the utilization is 98.44% for the fully loaded server cluster.

Example 10

Example 10: consider a deployment with the following characteristics:
5 servers of which are allocated to active vCores and redundant vCores;
N=4 indicating a 4 to 1 redundant vCore;
2 different types of vCores, namely 1-1 vCores and 1-2 vCores, each of which with one version of the software.
The allocation of 1-1 vCores and 1-2 vCores may be as follows (with each only having 1 version of the software):

| Server 1 | 8 1-1 vCores | 13 1-2 vCores | Active |
| | 0 1-1 vCores | 2 1-2 vCores | Redundant (61 logical cores) |
| Server 2 | 6 1-1 vCores | 13 1-2 vCores | Active |
| | 2 1-1 vCores | 3 1-2 vCores | Redundant (64 logical cores) |
| Server 3 | 6 1-1 vCores | 13 1-2 vCores | Active |
| | 2 1-1 vCores | 3 1-2 vCores | Redundant (64 logical cores) |
| Server 4 | 6 1-1 vCores | 12 1-2 vCores | Active |
| | 2 1-1 vCores | 4 1-2 vCores | Redundant (64 logical cores) |
| Server 5 | 6 1-1 vCores | 11 1-2 vCores | Active |
| | 2 1-1 vCores | 4 1-2 vCores | Redundant (61 logical cores) |

The 4 to 1 redundancy, together with ceil(x), results in the following required redundant 1-1 vCores and 1-2 vCores:
8 redundant 1-1 vCores (ceil(32/4)) 16 redundant 1-2 vCores (ceil(62/4))
With 8 redundant 1-1 vCores (16 logical cores) and 16 redundant 1-2 vCores (48 logical cores) the total is 64 logical cores which is available on server cluster allocated to redundant vCores. It is noted that the allocation of vCores is limited to groups of 4 (i.e., the redundancy factor), which eliminates the rounding associated with redundancy to make better usage of the redundant vCores. Accordingly, this arrangement provides the required redundancy of 4 to 1 across 5 servers. Further, for any host failure, the redundant vCores are spread in sufficient fashion that they may cover the number of active vCores from the failed server. In this example, the utilization is 98.12% for the fully loaded server cluster.

Example 11

Example 11: consider a deployment with the following characteristics:
5 servers of which are allocated to active vCores and redundant vCores;
N=4 indicating a 4 to 1 redundant vCore;
2 different types of vCores, namely 1-1 vCores and 1-2 vCores, each of which with two versions of the software.
The allocation of 1-1 vCores and 1-2 vCores may be as follows (with each only having two version of the software):

| Server 1 | 4 1-1 vCores | 7 1-2 vCores | Active Version 1 |
| | 4 1-1 vCores | 6 1-2 vCores | Active Version 2 |
| | 0 1-1 vCores | 1 1-2 vCores | Redundant Version 1 |
| | 0 1-1 vCores | 1 1-2 vCores | Redundant Version 2 (61 logical cores) |
| Server 2 | 3 1-1 vCores | 7 1-2 vCores | Active Version 1 |
| | 3 1-1 vCores | 6 1-2 vCores | Active Version 2 |
| | 1 1-1 vCores | 2 1-2 vCores | Redundant Version 1 |
| | 1 1-1 vCores | 1 1-2 vCores | Redundant Version 2 (64 logical cores) |
| Server 3 | 3 1-1 vCores | 7 1-2 vCores | Active Version 1 |
| | 3 1-1 vCores | 6 1-2 vCores | Active Version 2 |
| | 1 1-1 vCores | 2 1-2 vCores | Redundant Version 1 |
| | 1 1-1 vCores | 1 1-2 vCores | Redundant Version 2 (64 logical cores) |
| Server 4 | 3 1-1 vCores | 7 1-2 vCores | Active Version 1 |
| | 3 1-1 vCores | 5 1-2 vCores | Active Version 2 |
| | 1 1-1 vCores | 2 1-2 vCores | Redundant Version 1 |
| | 1 1-1 vCores | 2 1-2 vCores | Redundant Version 2 (64 logical cores) |
| Server 5 | 2 1-1 vCores | 6 1-2 vCores | Active Version 1 |
| | 2 1-1 vCores | 5 1-2 vCores | Active Version 2 |
| | 1 1-1 vCores | 2 1-2 vCores | Redundant Version 1 |
| | 1 1-1 vCores | 2 1-2 vCores | Redundant Version 2 (61 logical cores) |

The 4 to 1 redundancy, together with ceil(x), results in the following required redundant 1-1 vCores and 1-2 vCores:
8 redundant 1-1 vCores (ceil(32/4)) 16 redundant 1-2 vCores (ceil(62/4))
The redundant vCores a split between the different software versions.
With 8 redundant 1-1 vCores (16 logical cores) and 16 redundant 1-2 vCores (48 logical cores) the total is 64 logical cores which is available on server cluster allocated to redundant vCores. For any host failure, the redundant vCores are spread in sufficient fashion that they may cover the number of active vCores from the failed server.
The table below illustrates different combinations of vCore 1-1 and vCore 1-2 that fit on a server with 64 logical cores. The table below is based upon calculating the vCore 1-1 first and determining the residual vCore 1-2 that will fit.

| 1-1 vCore | 1-2 vCore | vCore 1-1 Logical Cores | vCore 1-2 Logical Cores | Used Logical Cores |
|---|---|---|---|---|
| 0 | 21 | 0 | 63 | 63 |
| 1 | 20 | 2 | 60 | 62 |
| 2 | 20 | 4 | 60 | 64 |
| 3 | 19 | 6 | 57 | 63 |
| 4 | 18 | 8 | 54 | 62 |
| 5 | 18 | 10 | 54 | 64 |
| 6 | 17 | 12 | 51 | 63 |
| 7 | 16 | 1 | 48 | 62 |
| 8 | 16 | 16 | 48 | 64 |
| 9 | 15 | 18 | 45 | 63 |
| 10 | 14 | 20 | 42 | 62 |
| 11 | 14 | 22 | 42 | 64 |
| 12 | 13 | 24 | 39 | 63 |
| 13 | 12 | 26 | 36 | 62 |
| 14 | 12 | 28 | 36 | 64 |
| 15 | 11 | 30 | 33 | 63 |
| 16 | 10 | 32 | 30 | 62 |
| 17 | 10 | 34 | 30 | 64 |
| 18 | 9 | 36 | 27 | 63 |
| 19 | 8 | 38 | 24 | 62 |
| 20 | 8 | 40 | 24 | 64 |
| 21 | 7 | 42 | 21 | 63 |
| 22 | 6 | 44 | 18 | 62 |
| 23 | 6 | 46 | 18 | 64 |
| 24 | 5 | 48 | 15 | 63 |
| 25 | 4 | 50 | 12 | 62 |
| 26 | 4 | 52 | 12 | 64 |
| 27 | 3 | 54 | 9 | 63 |

-continued

| 1-1 vCore | 1-2 vCore | vCore 1-1 Logical Cores | vCore 1-2 Logical Cores | Used Logical Cores |
|---|---|---|---|---|
| 28 | 2 | 56 | 6 | 62 |
| 29 | 2 | 58 | 6 | 64 |
| 30 | 1 | 60 | 3 | 63 |
| 31 | 0 | 62 | 0 | 62 |
| 32 | 0 | 64 | 0 | 64 |

The table below illustrates different combinations of vCore 1-1 and vCore 1-2 that fit on a server with 64 logical cores. The table below is based upon calculating the vCore 1-2 first and determining the residual vCore 1-1 that will fit. The most inefficient options are removed.

| 1-1 vCore | 1-2 vCore | vCore 1-1 Logical Cores | vCore 1-2 Logical Cores | Used Logical Cores |
|---|---|---|---|---|
| 32 | 0 | 64 | 0 | 64 |
| 30 | 1 | 60 | 3 | 63 |
| 29 | 2 | 58 | 6 | 64 |
| 27 | 3 | 54 | 9 | 63 |
| 26 | 4 | 52 | 12 | 64 |
| 24 | 5 | 48 | 15 | 63 |
| 23 | 6 | 46 | 18 | 64 |
| 21 | 7 | 42 | 21 | 63 |
| 20 | 8 | 40 | 24 | 64 |
| 18 | 9 | 36 | 27 | 63 |
| 17 | 10 | 34 | 30 | 64 |
| 15 | 11 | 30 | 33 | 63 |
| 14 | 12 | 28 | 36 | 64 |
| 12 | 13 | 24 | 39 | 63 |
| 1 | 14 | 22 | 42 | 64 |
| 9 | 15 | 18 | 45 | 63 |
| 8 | 16 | 16 | 48 | 64 |
| 6 | 17 | 12 | 51 | 63 |
| 5 | 18 | 10 | 54 | 64 |
| 3 | 19 | 6 | 57 | 63 |
| 2 | 20 | 4 | 60 | 64 |
| 0 | 21 | 0 | 63 | 63 |

By way of example, the active vCore placement may use the following technique: vCore server=1+(I−1)% N, where I is the number of the instance deployed, i.e. I=1, 2, 3, . . . , where % represents the Modulo function. This may also be represented as (I−1)Modulo N+1, where I is the $1^{st}$, $2^{nd}$, $3^{rd}$, . . . etc. vCore deployed. By way of example, the standby vCore placement may use the following technique: vCoreStandby_Server=1+(I*2N−1)% N, where I is the number of the standby instance deployed, I=1, 2, 3, . . . , where % represents the Modulo function. This may also be represented as (2N−1)*I*Modulo N+1, where I is the $1^{st}$, $2^{nd}$, $3^{rd}$, . . . etc. vCore deployed. S starts at the last host I the cluster and goes backwards to the first host and wraps around to the last host. Standby vCore begins with the active vCore #1 and new standby are added every N active vCore deployments.

In another embodiment each type of vCore may have a different redundancy factor. In another embodiment each type of vCore with a different software version thereon may have a different redundancy factor.

Figure 17:
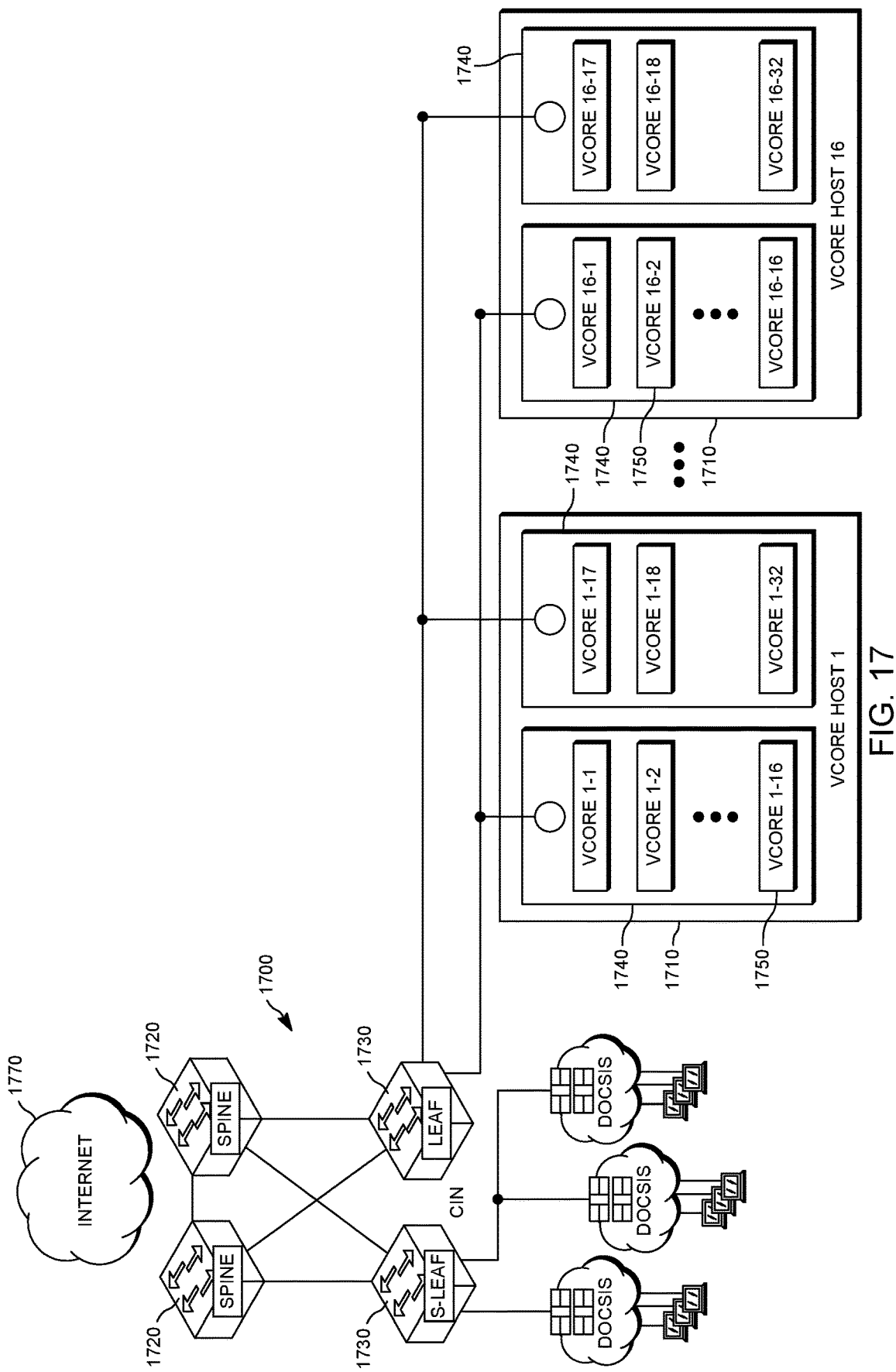
FIG. 17 illustrates a cable modem termination system that includes vCore hosts and associated vCores.

Referring to FIG. 17, the architecture of a switching network 1700 for a set of vCore servers 1710 each of which includes a vCore pod 1740 with a plurality of vCores 1750 therein are preferably arranged in a leaf-spine architecture that is composed of spine switches 1720 and leaf switches 1730. The leaf switches 1730 are used to gather the traffic from the vCore servers. The leaf switches 1730 then link to the Internet 1770, or otherwise, through a set of spine switches 1720. Preferably, every leaf switch 1730 connects to a plurality of spine switches 1720, and preferably all of the spine switches, which reduces network latency and bottlenecks. The leaf switches may be layer 2 and/or layer 3 switches, as desired. In general, there may be N number of vCore hosts, where each of the vCore hosts may be referred to as vCore host N, vCore host N−1, vCore host N−2, . . . vCore host 1. In general, there may be any number of vCores on any particular vCore host, and the number of such vCores may vary from vCore host to vCore host. For example, there may be M vCores on vCore host N−4, which may be referred to as a vCore M, vCore M−1, vCore M−2, . . . , vCore 1.

Figure 18:
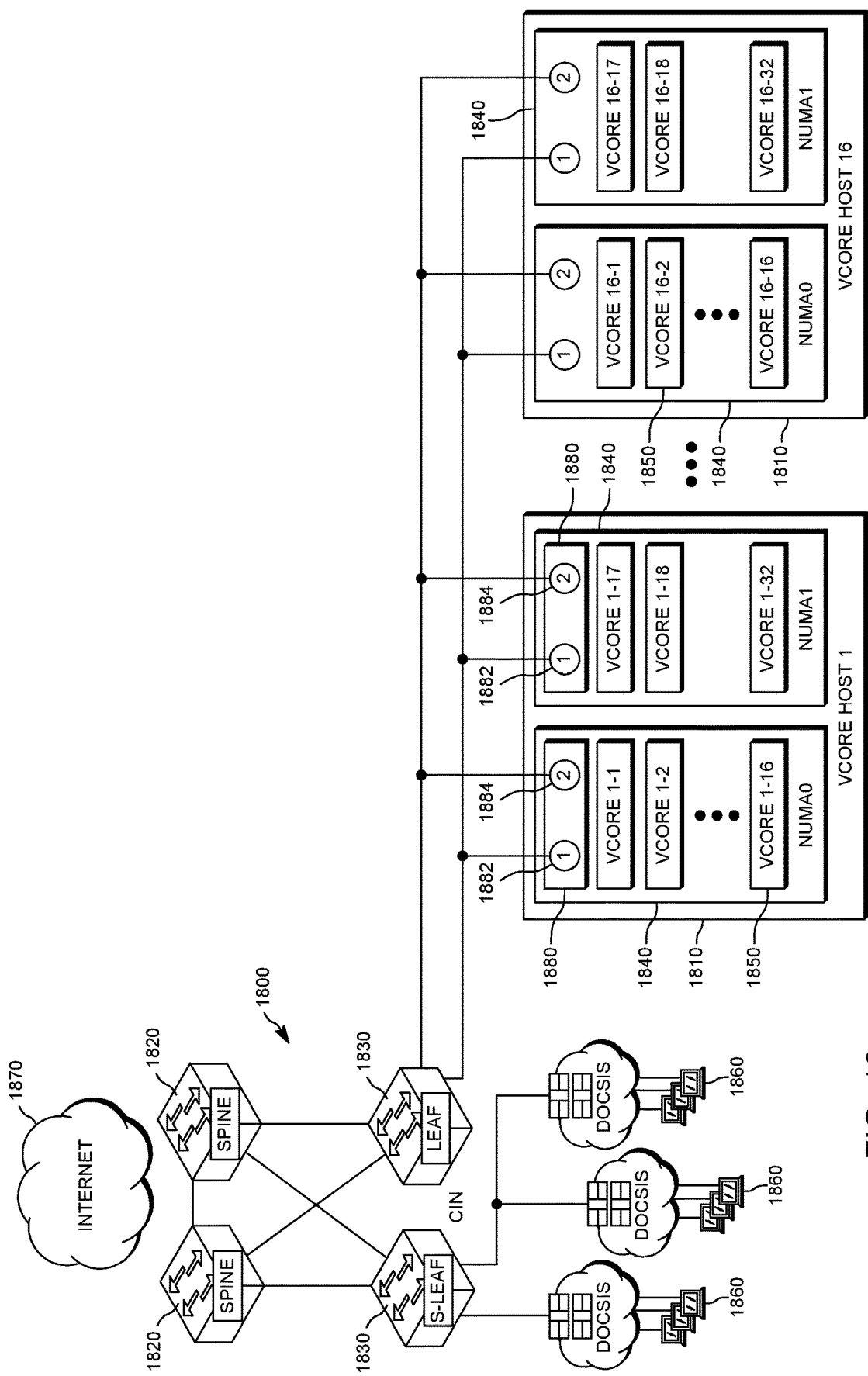
FIG. 18 illustrates a server system with vCores and network connectivity.

Referring to FIG. 18, a modified embodiment includes a switching network 1800 for a set of vCore servers 1810 each of which includes one or more vCore pods 1840 with a plurality of vCores 1850 therein are preferably arranged with a leaf-spine architecture that is composed of spine switches 1820 and leaf switches 1830. The leaf switches 1830 interconnect with the consumer premise equipment 1860. The spine switches 1820 are preferably interconnected with the Internet 1870.

Each of the vCore pods 1840 is preferably supported by a respective processor. In this manner, a first vCore pod 1840 is run on a first processor of the vCore server 1810. In this manner, a second vCore pod 1840 is run on a second processor of the vCore server 1810. The separation of the processors, one for each vCore pod, increases the computational efficiency of the system.

The server 1810 preferably includes a pair of network interface cards 1880 (which may be in other forms than a "card") included in a peripheral component interconnect (PCI) of the server 1810, where each of the network interface cards includes a respective pair of network ports 1882, 1884. Each of the vCore pods 1840 may be associated with one of the network cards 1880 to send and receive data therefrom. In addition, each of the vCore pods 1840 may be associated with one of the processors to process data for sending and receiving data from the associated network cards 1880. In this manner, the server 1810 which includes a pair of processors, each processor is associated with a respective vCore pod, each respective vCore pod associated with a respective network card, each of the respective network cards associated with a respective pair of network ports. The respective network ports 1880, 1882 are interconnected to the leaf switch 1830. The pair of network ports 1880, 1882 provide for redundancy in the event of the failure of one of the network ports or otherwise the interconnection to the leaf switch 1830.

Figure 19:
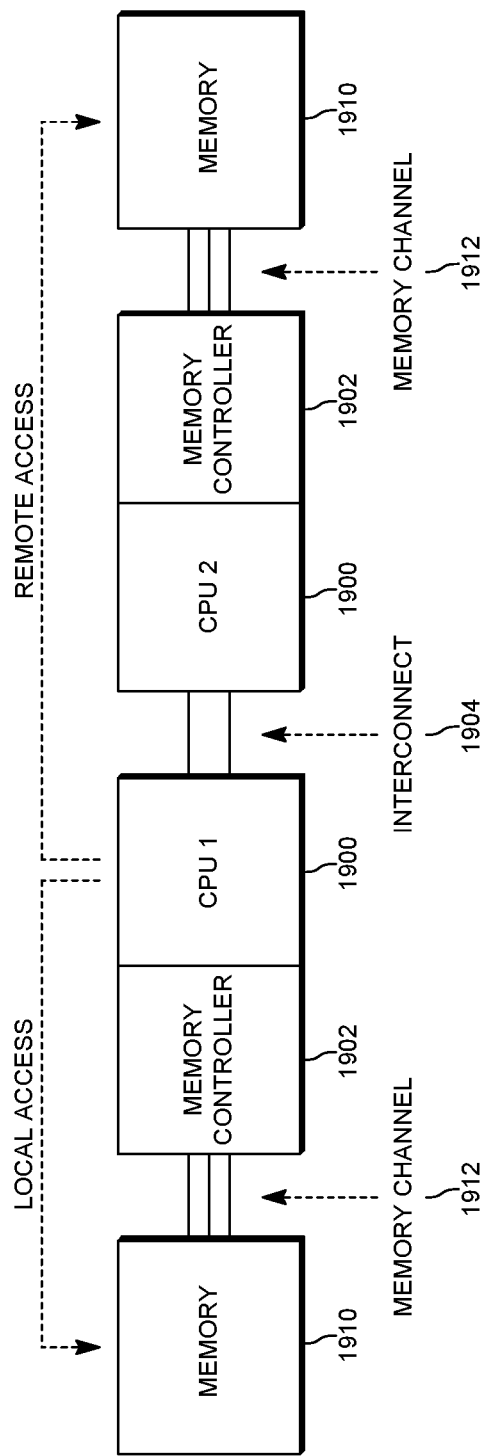
FIG. 19 illustrates a multi-processor memory architecture.

Referring also to FIG. 19, a pair of processors 1900 may include a respective memory controller 1902. The processors 1900 are interconnected 1904 to one another. Each of the processors 1900 include a respective memory 1910 that are interconnected to the respective processors 1900 by a memory channel 1912. The respective memory 1910 and processor 1900 pairs each have the most efficient memory access to one of the memories, generally referred to as "local access". The non-respective memory 1910 and processor 1900 pairs have less efficient memory access to the other of the memories, generally referred to as "remote access". Accordingly, preferably the respective processor 1900 for a vCore pod primarily uses the corresponding memory 1910 and processor pair. In addition, data throughput from a respective processor is configured to have a higher data throughput to a respective network card than the other network card included with the server. In this manner, the data throughput from the first processor is configured to have a higher data throughput to the first network card, and the data throughput from the second processor is configured to have a higher data throughput to the second network card, while data from the first processor/first network card and the second processor/second network card are capable of sending data to one another, it is has a lower data throughput. In this manner, the server 1810 which includes a pair of processors, each processor is associated with a respective vCore pod, each respective vCore pod associated with a respective network card, each of the respective network cards associated with a respective pair of network ports, in a manner where the data throughput from the processor to the respective network card is selected to have the greater bandwidth. Preferably, the vCore to vCore data traffic uses layer 2, and the vCore to Internet data traffic uses layer 3.

Each of the pair of network ports 1880, 1882 are preferably configured and interconnected to a different virtual local area network (VLAN). The VLAN is a broadcast domain that is partitioned and isolated in the network at the data link layer 2. In this manner, the server 1810 may provide and receive data in a redundant manner through the network card to the leaf switch 1830 for greater redundancy and reliability. Preferably, each of the network ports 1882 are configured to use the same first VLAN and each of the network ports 1884 are configured to use the same second VLAN.

Figure 20:
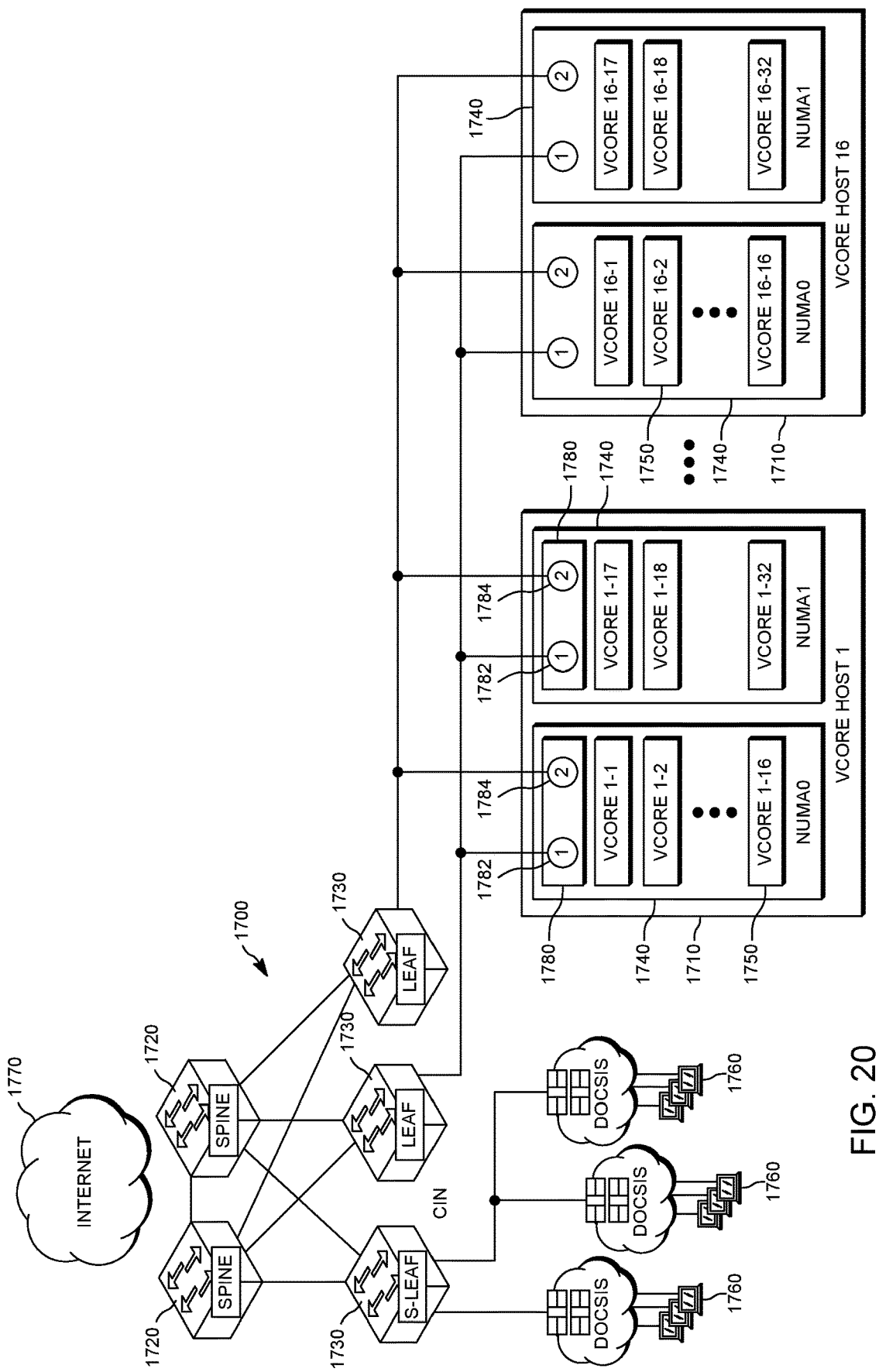
FIG. 20 illustrates a server system with vCores and network connectivity.

Referring to FIG. 20, another embodiment illustrates a system where each of the servers is interconnected to a different leaf switch for increased redundancy and reliability. In this manner, if a leaf switch fails then the other leaf switch to which the vCore is interconnected with will provide data connectivity.

Figure 21:
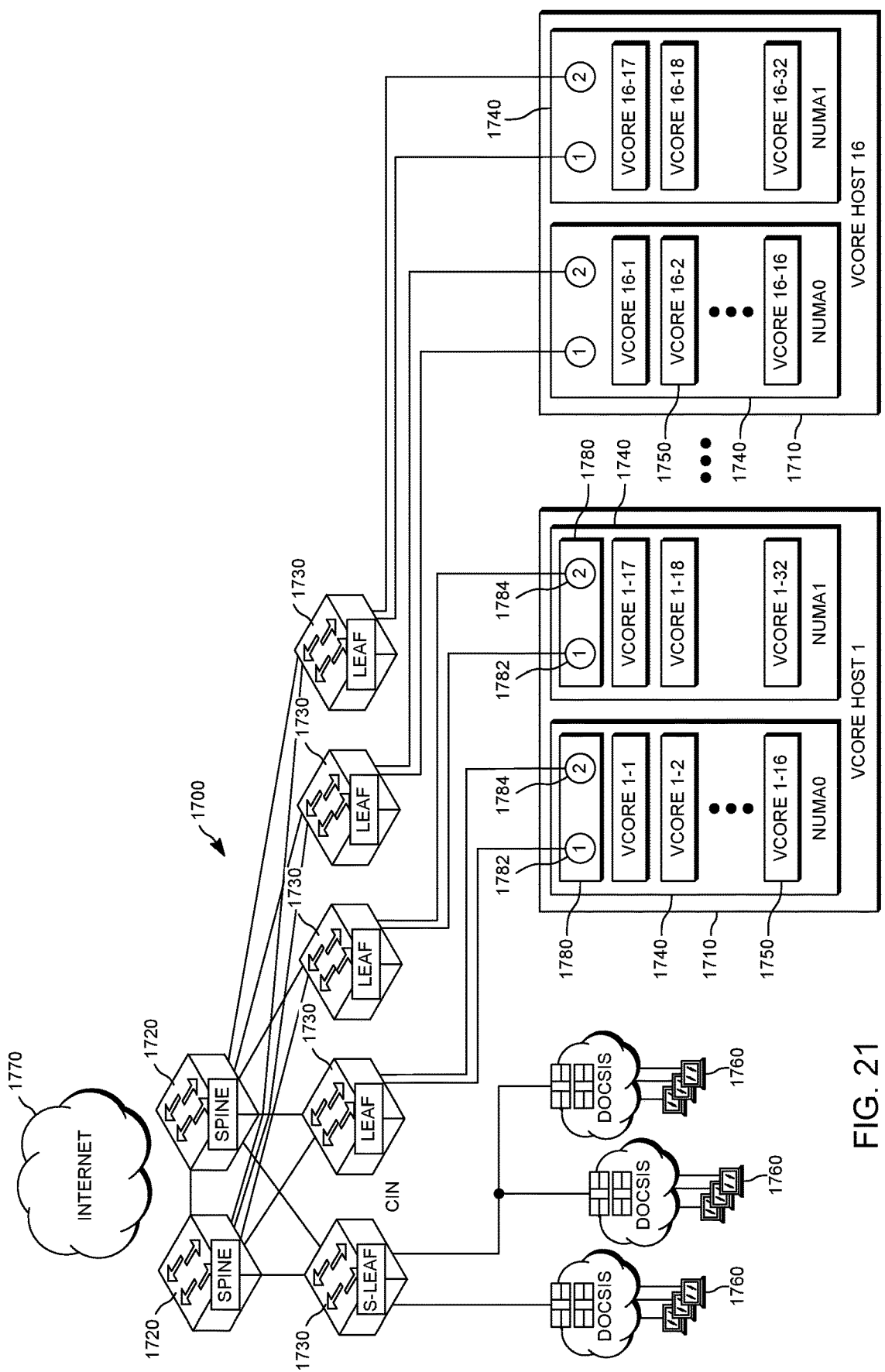
FIG. 21 illustrates a server system with vCores and network connectivity.

Referring to FIG. 21, another embodiment illustrates a system where each vCore pod is interconnected to its own leaf switch.

Figure 22:
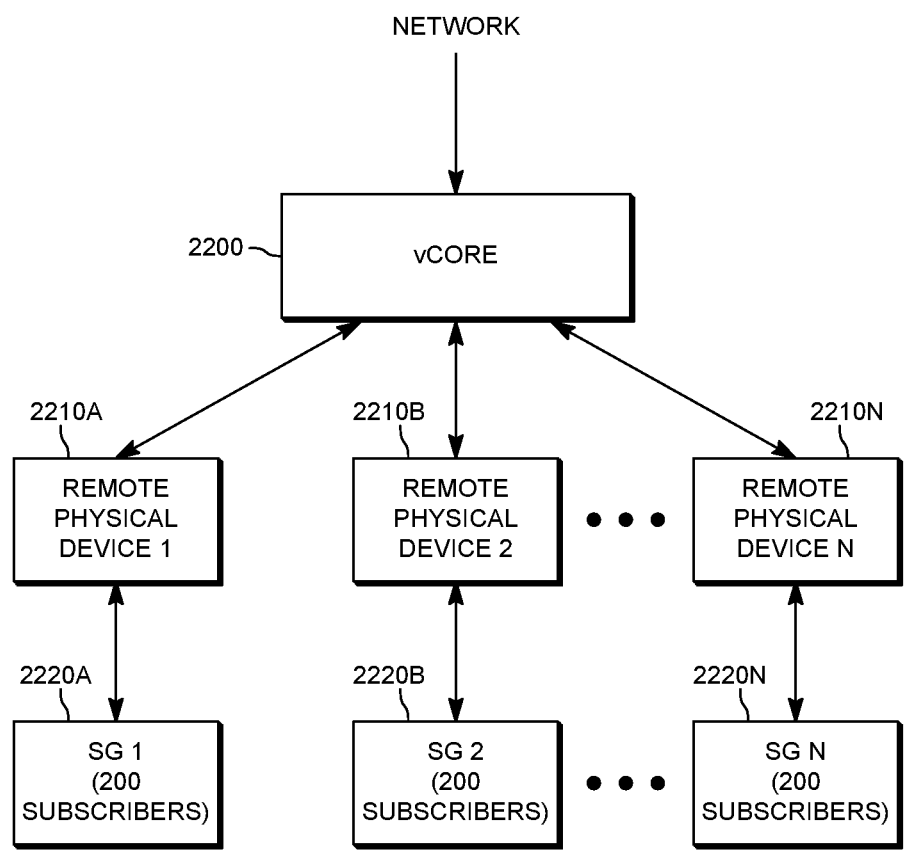
FIG. 22 illustrates a vCore and multiple remote physical devices.

Referring to FIG. 22, a vCore 2200 may provide services to one or more remote physical devices (RPDs) 2210A, 2210B, . . . 2210N. Each of the remote physical devices (RPDs) 2210A, 2210B, . . . 2210N are associated with a corresponding service group 2220A, 2220B, . . . 2220N, which may provide services to a group of customer premises equipment. While a vCore may provide services to only a single remote physical device and the corresponding single service group, this tends to be an inefficient use of computing resources on the server because of the instantiation and management of a substantial number of vCores, each of which consumes a substantial amount of resources. Also, the vCore may have the capacity to process a substantial amount of data but the associated RPD may only be currently providing services for a limited amount of data, and in this manner there is often a substantial unused amount of capacity for the associated vCore. Further, the vCore may have the capacity to process a substantial amount of data but the associated RPD may be currently providing services for an even greater amount of data, and in this manner there may be insufficient capacity for the associated vCore. In contrast to a one-to-one correspondence between the vCore, the remote physical device, and the service group, it is desirable to have a one-to-many correspondence between the vCore, a set of remote physical devices, and a set of service groups, such as illustrated in FIG. 22. Preferably, a defined set of cores and/or logical cores are used by the vCore to provide services for the set of remote physical devices.

Over time each of the service groups 2220A-2220N may have different usage patterns, such that during particular times of the day, the week, the month, or the year the usage tends to vary in some manner. In some cases, each of the service groups 2220A-2220N may have the different usage patterns that may be predictable, and in other cases the different usage patterns may not be predictable. Typically, on an annual basis the usage for each of the service groups tends to increase. Also, the collection of the service groups 2220A-2220N as a whole may have variable usage patterns, such that during particular times of the day, the week, the month, or the year that tends to vary in some manner. In some cases, the collection of service groups 2220A-2220N as a whole may have the usage patterns that may be predictable, and in other cases the usage patterns that are not predictable. Typically, on an annual basis the usage for each of the collection of service groups tends to increase.

Figure 23:
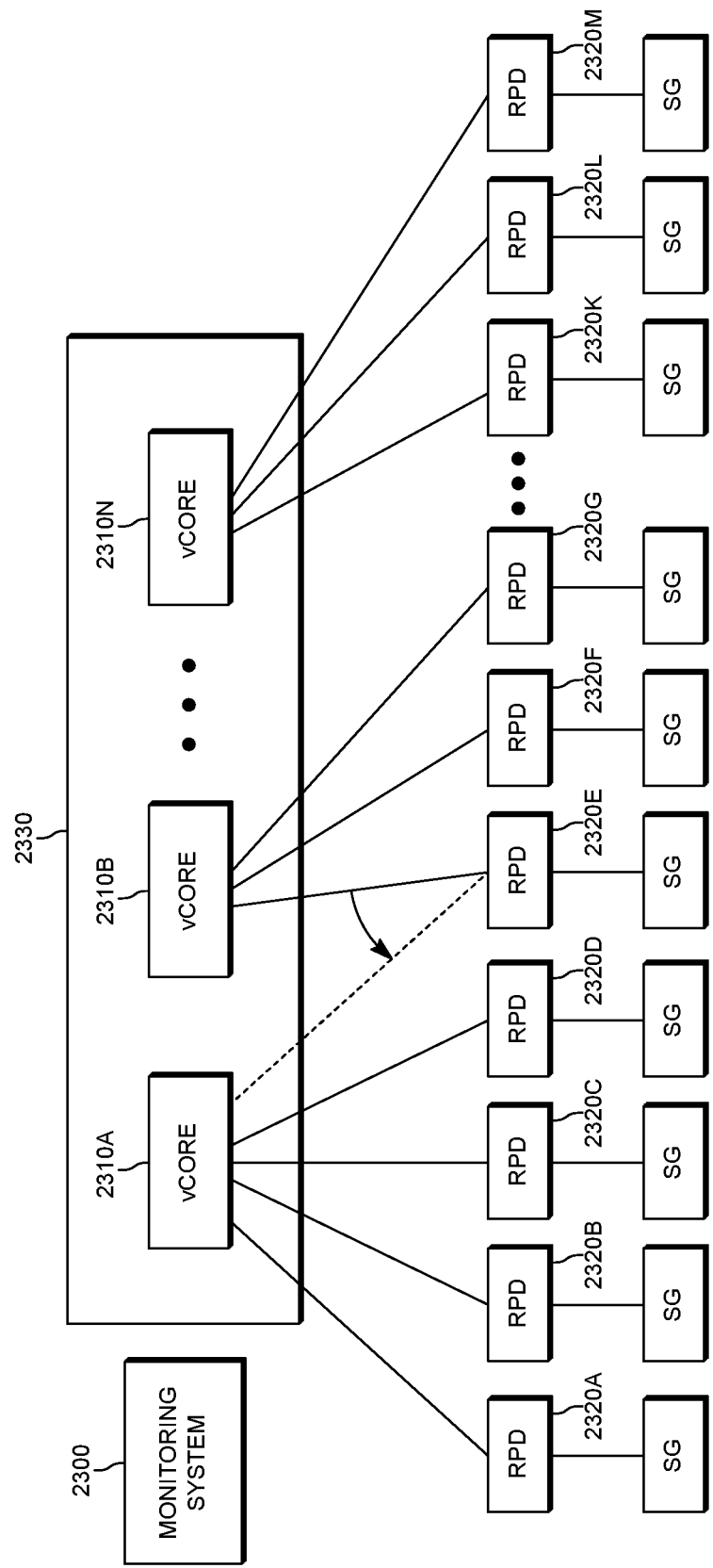
FIG. 23 illustrates multiple vCores and multiple remote physical devices.

Referring to FIG. 23, a monitoring system 2300 may be used to manage a distribution of remote physical devices 2320A-2320M among a set of associated vCores 2310A-2310N. The associated vCores may be supported by one or more servers 2330. The monitoring system 2300 may be included on the one or more servers 2330 or otherwise on a computing device apart from the one or more servers 2330. The monitoring system 2300 may determine the utilization of each of the vCores 2310A-2310N, to determine those that have substantial unused capacity, or those that are more likely to exceed their capacity or otherwise have exceeded their capacity. Also, based upon usage patterns, the monitoring system 2300 may proactively estimate the anticipated future usage of each of the vCores and groups of vCores. The monitoring system 2300 may similarly determine the utilization of each of the remote physical devices 2320A-2320M to determine the capacity being used by each of the remote physical devices. In the event that the vCore has unused capacity, the monitoring system 2300 may reassign a remote physical device from one vCore to another vCore that has been determined to be underutilized or otherwise it being desirable to reassign the remote physical device to. The reassignment from one vCore to another vCore may include copying all or a portion of the state information, inclusive of any configuration data, of the remote physical device and/or the vCore from the source vCore to the destination vCore.

Figure 24:
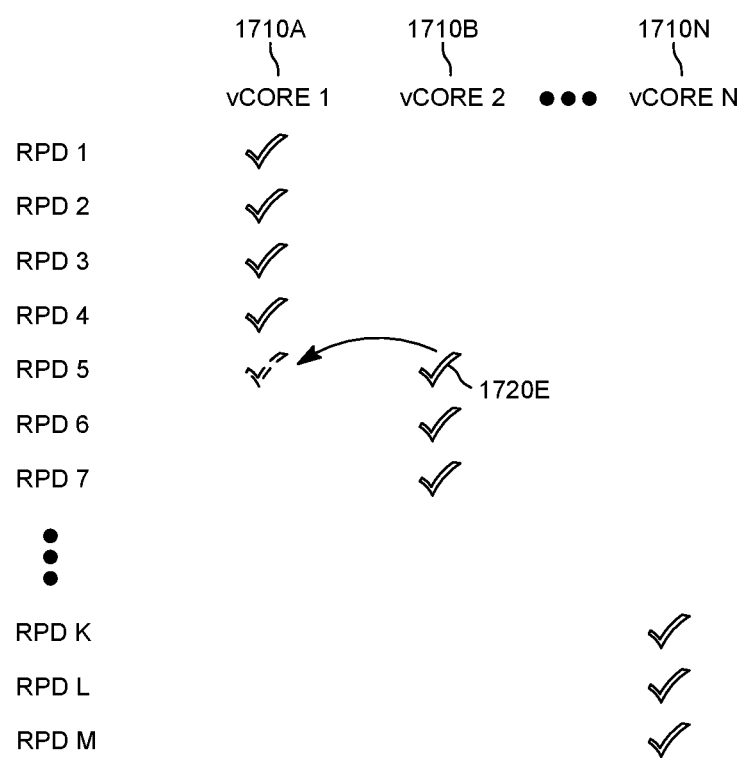
FIG. 24 illustrates reassignment of a remote physical device from a source vCore to a destination vCore.

Referring to FIG. 24, the monitoring system may automatically or as a result of a user initiated selection reassign a particular remote physical device (e.g., RPD 2320E), including the associated service group, from a source vCore (e.g., 2310B) to a destination vCore (e.g., 2310A). In this manner, the usage for vCore 2310A is increased while the usage for vCore 2310B is decreased.

While the automatic or user initiated reassignment of one or more remote physical devices from one vCore to another vCore, provides effective rebalancing of the usage for any particular vCore, there tends to be a processing bottleneck when the data being processed for a set of remote physical devices by a particular vCore exceeds a threshold level for the particular vCore, depending on its configuration and the computational capacity of the server hardware. This creates a bottleneck in the processing capabilities to effectively provide data to the remote physical devices and/or receiving data from the remote physical devices. To alleviate the bottleneck, it is desirable to modify the processing structure of the vCore.

Figure 25:
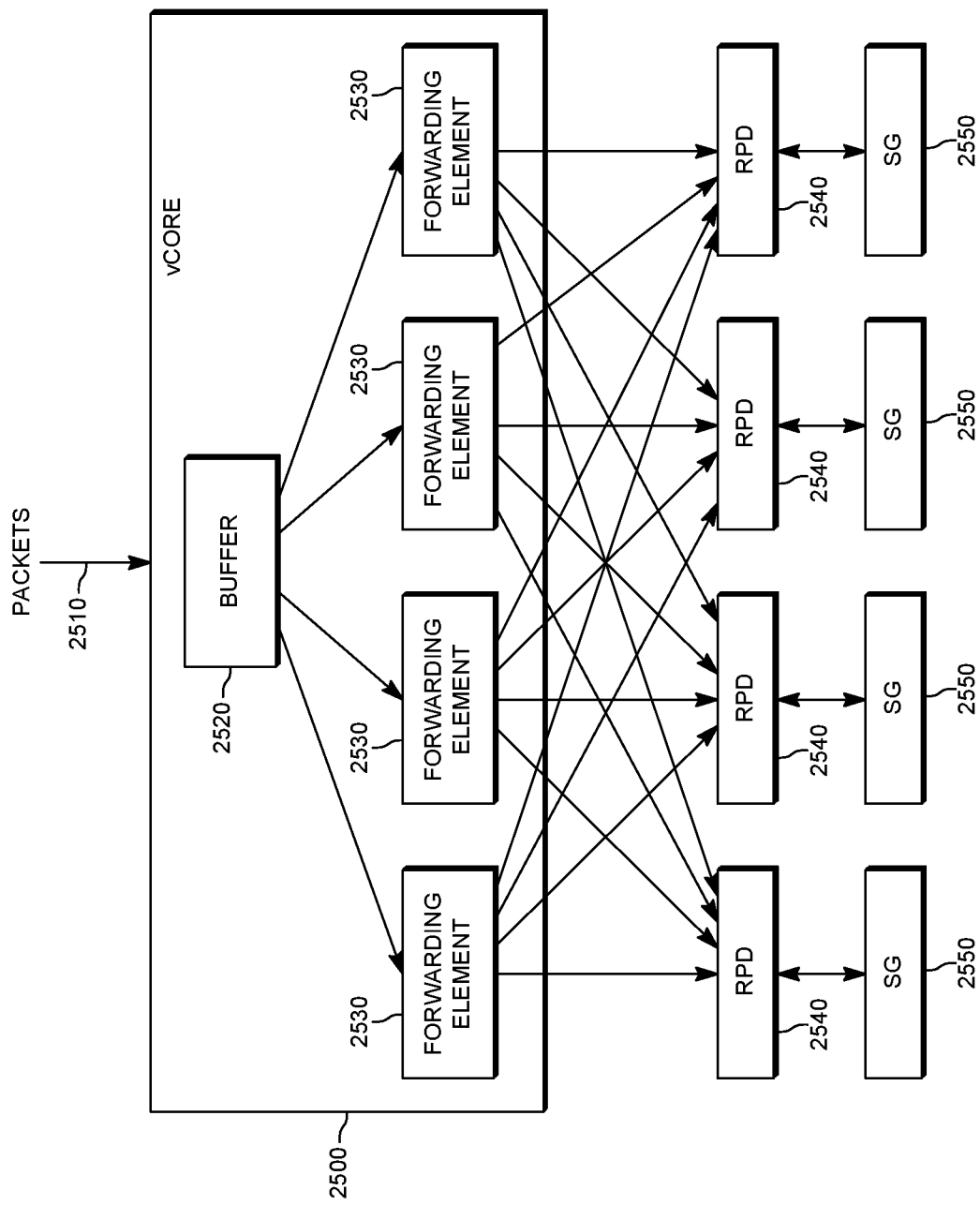
FIG. 25 illustrates multiple forwarding elements for a vCore for downstream traffic.

Referring to FIG. 25, for downstream traffic, a vCore 2500 may receive packets 2510 which are buffered by a buffer 2520, such as a first in first out buffer, inclusive of a single packet buffer. Each of the packets 2510 within the buffer 2520 are each selectively provided to one of a plurality of forwarding elements 2530. In this manner, each of the received packets may be provided to any one of the forwarding elements 2530. The selected forward element 2530, for any particular packet, may be selected in any suitable manner, such as a rotational basis, a flag indicating availability for another packet by a selected forwarding element, or a selected forwarding element selecting a next packet buffered by the buffer 2520. By the use of a parallel set of forwarding elements 2530, each of which may process packets in parallel with one another, the rate at which the vCore may process packets tends not to be as limited as it otherwise would if it was fully single threaded for each and every packet that is received. Each of the forwarding elements 2530 may perform suitable processing for each packet prior to being forwarded to the designated remote physical device 2540. The forwarding elements 2530 may process the packets in a suitable manner, such as a look up of a source IP address, a look up of a destination IP address, determine a destination port for the packet, re-stamp the packet with an IP address of the next hop, provide encryption of the packet, and/or Layer 2 Tunneling Protocol packet encapsulation. By way of example, each of said forwarding elements may selectively receive selected ones of the packets of data from the buffer based upon at least one of (1) a source IP address, (2) a destination IP address, (3) a source port, (4) a destination port, and (5) a protocol type. By way of example, each of the forwarding elements selectively processes selective respective packets including at least one of (1) re-stamping of an IP address of said respective packets, (2) encryption of said respective packets, and (3) Layer 2 tunneling encapsulation of said respective packets.

The forwarding elements 2530 may each process respective packets in parallel or any other suitable manner, as desired. The forwarding elements 2530 may each selectively provide packets to any one of a plurality of remote physical devices, depending on the destination of the packet (e.g., service group). In this manner, each of the packets from the forwarding elements 930 may be selectively provided to any one of the remote physical devices 2540. Each of the remote physical devices 2540 provides and receives data from a respective service group 2550.

Figure 26:
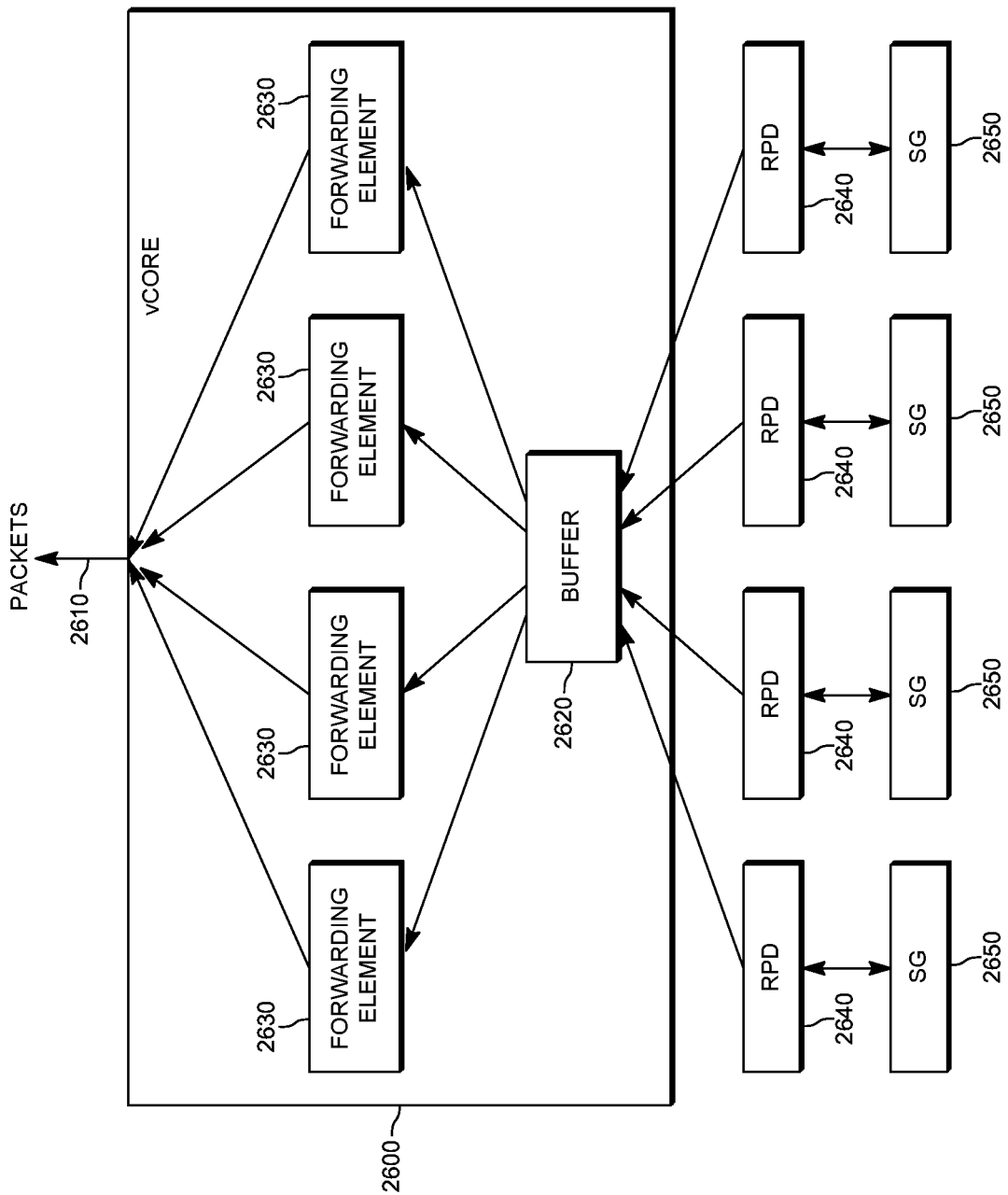
FIG. 26 illustrates multiple forwarding elements for a vCore for upstream traffic.

Referring to FIG. 26, for upstream traffic, a vCore 2600 may receive packets 2610, from a plurality of remote physical devices 2640 and associated service groups 2650, which are buffered by a buffer 2620, such as a first in first out buffer, inclusive of a single packet buffer. Each of the packets within the buffer 2620 are each selectively provided to any one of a plurality of forwarding elements 2630. In this manner, each of the received packets may be provided to any one of the forwarding elements 2630. The selected forward element 2530 may be selected in any suitable manner, such as for example, a rotational basis, a flag indicating availability for another packet by a selected forwarding element, or a selected forwarding element selecting a next packet buffered by the buffer. By the use of a parallel set of forwarding elements 2630, the rate at which the vCore may process packets tends not to be as limited as it otherwise would if it was fully single threaded for each and every packet that is received. Each of the forwarding elements 2630 may perform suitable processing for each packet prior to being forwarded to its destination. The forwarding elements 2530 may process the packet in a suitable manner, such as a look up of a source IP address, a look up of a destination IP address, determine a destination port for the packet, re-stamp the packet with an IP address of the next hop, provide encryption of the packet, and/or Layer 2 Tunneling Protocol packet encapsulation. The forwarding elements 2630 may each process respective packets in parallel or any other suitable manner, as desired. The packets from the forwarding elements 2630 are provided as packets 2610 to their destination.

If it is desirable to further increase the throughput of the vCore, one technique may be to increase the number of forwarding elements, either for the upstream traffic and/or the downstream traffic. The monitoring system may selectively deploy vCores with a different number of forwarding elements for upstream and/or downstream traffic, as desired, to accommodate data rates. Further, the monitoring system may selectively increase the number of forwarding elements, either for the upstream traffic and/or the downstream traffic, in combination with selecting the number of downstream thread(s) and/or upstream thread(s) for the vCore.

By way of example, if one of the leaf switches fails then the other interconnected leaf switch will accommodate the data traffic for the failed leaf switch. The leaf switch preferably provides layer 2 and layer 3 data connectivity. The redundant leaf switches are preferably arranged to accommodate excess capacity under normal operating conditions so that is a leaf switch fails the remaining leaf switch(es) can accommodate the resulting data traffic.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:
1. A cable distribution system comprising:
(a) a head end connected to a plurality of customer devices through a transmission network that includes a remote fiber node that converts received data to analog data suitable to be provided on a coaxial cable for said plurality of customer devices, where said head end includes at least one server each of which includes a respective processor;
(b) a first virtualized cable modem termination system instantiated on one of said servers of said head end configured to provide services to said plurality of customer devices through said transmission network;
(c) said first virtualized cable modem termination system instantiated on said one of said servers having at least one upstream threads for upstream traffic of dataplane services running on at least one of said cores of a first processor of said one of said servers;
(d) said first virtualized cable modem termination system instantiated on said one of said servers having at least one downstream thread for downstream traffic of dataplane services running on at least one of said cores of said first processor of said one of said servers, where said at least one upstream threads for dataplane services are running on at least one logical core of said at least one of said cores of said processor and are not used for downstream traffic for dataplane services, where said at least one downstream threads for dataplane services are running on at least one logical core of said at least one of said cores of said processor and are prohibited from being used for upstream traffic for dataplane services, where neither of said logical cores used for said downstream traffic for dataplane services or said upstream traffic for dataplane services are shared with any other virtualized cable modem termination systems;
(e) a second virtualized cable modem termination system instantiated on one of said servers of said head end not configured to provide services to any of said plurality of customer devices through said transmission network;
(f) a monitoring system that detects a failure of said first virtualized cable modem termination system and, in response to said detecting said failure, configures said second virtualized cable modem termination system to provide services to said plurality of customer devices through said transmission network,
  (i) wherein said second virtualized cable modem termination system is configured to use at least as many logical cores for downstream traffic of dataplane services as said first virtualized cable modem termination system,
  (ii) wherein said second virtualized cable modem termination system is configured to use at least as many logical cores for upstream traffic of dataplane services as said first virtualized cable modem termination system,
  (iii) wherein said second virtualized cable modem termination system is prohibited from being configured to use fewer than as many logical cores for downstream traffic of dataplane services as said first virtualized cable modem termination system,
  (iv) wherein said second virtualized cable modem termination system is prohibited from being configured to use fewer than as many logical cores for upstream traffic of dataplane services as said first virtualized cable modem termination system.

2. The cable distribution system of claim 1 wherein said first virtualized cable modem termination system is instantiated on a first one of said servers of said head end and said second virtualized cable modem termination system is instantiated on a second one of said servers of said head end.

3. The cable distribution system of claim 1 wherein said configures said second virtualized cable modem termination system includes at least one of (1) DOCSIS, (2) RF, (3) RPD, (4) cable-mac, (5) IP addressing, (6) and routing.

4. The cable distribution system of claim 3 further comprising said second virtualized cable modem termination system establishing a connection with said plurality of customer devices after said monitoring system configures said second virtualized cable modem termination system to provide service.

5. The cable distribution system of claim 3 wherein said monitoring system configures said second virtualized cable modem termination system, and said second virtualized cable modem termination system includes at least one of (1) RPHY MAC Core, (2) CPU Core Ids, (3) data plane network VF addresses, (4) MAC addresses for interfaces, (5) encryption VFs, and (6) memory allocation.

6. The cable distribution system of claim 5 further comprising said second virtualized cable modem termination system establishing a connection with said plurality of customer devices after said monitoring system configures said second virtualized cable modem termination system to provide service.

7. The cable distribution system of claim 1 wherein said monitoring system configures said second virtualized cable modem termination system based upon at least one of (1) RPHY MAC Core, (2) CPU Core Ids, (3) data plane network VF addresses, (4) MAC addresses for interfaces, (5) encryption VFs, and (6) memory allocation.

8. The cable distribution system of claim 7 further comprising said second virtualized cable modem termination system establishing a connection with said plurality of customer devices after said monitoring system configures said second virtualized cable modem termination system to provide service.

9. The cable distribution system of claim 1 further comprising a cache that provides said configuration data that said monitoring system uses when it configures said second virtualized cable modem termination system to provide services to said plurality of customer devices through said transmission network.

10. The cable distribution system of claim 9 wherein said cache is an in-memory cache and maintained on at least one of said servers that is different than any of said servers where any of said first virtualized cable modem termination system and said second virtualized cable modem termination system are said instantiated.

11. The cable distribution system of claim 9 wherein a key is provided to said second virtualized cable modem termination system to access said cache.

12. The cable distribution system of claim 1 wherein said monitoring system configures said second virtualized cable modem termination system and said configuration is based upon a layer 2 tunneling protocol sequence number of said first virtualized cable modem termination system.

13. The cable distribution system of claim 1 wherein said second virtualized cable modem termination system has a broadcast domain that is the same as a broadcast domain of said first virtualized cable modem termination system.

14. The cable distribution system of claim 1 wherein a switch associated with said second virtualized cable modem termination system is modified by said monitoring system to provide a broadcast domain that is the same as a broadcast domain of said first virtualized cable modem termination system.

15. The cable distribution system of claim 1 wherein said first virtualized cable modem termination system is prohibited from being replaced by a plurality of other virtualized cable modem termination system providing services to said plurality of customer devices through said transmission network.

16. The cable distribution system of claim 1 wherein said monitoring system further selects another server for said second virtualized cable modem termination system, wherein said another server has at least as much processing capabilities for providing data throughput at a logical thread level as said one of said servers where said first virtualized cable modem termination system is instantiated.

17. The cable distribution system of claim 1 wherein said second virtualized cable modem termination system has an updated version of software in relation to said first virtualized cable modem termination system.

* * * * *